United States Patent
Batra et al.

(10) Patent No.: US 10,438,266 B1
(45) Date of Patent: Oct. 8, 2019

(54) SERVER-BASED FEATURE DETECTION AND GENERATION OF GRAPHICAL REPRESENTATION OF FEATURE DISTINCTIONS

(71) Applicant: Amazon Technologies, Inc., Seattle, WA (US)

(72) Inventors: Akanksha Batra, New Delhi (IN); Syama Prasad Suprasadachandran Pillai, Bangalore (IN)

(73) Assignee: Amazon Technologies, Inc., Seattle, WA (US)

( * ) Notice: Subject to any disclaimer, the term of this patent is extended or adjusted under 35 U.S.C. 154(b) by 595 days.

(21) Appl. No.: 15/200,901

(22) Filed: Jul. 1, 2016

(51) Int. Cl.
| | |
|---|---|
| *G06Q 30/06* | (2012.01) |
| *G06F 3/0482* | (2013.01) |
| *H04L 29/08* | (2006.01) |
| *G06F 16/248* | (2019.01) |
| *G06F 16/9535* | (2019.01) |
| *G06F 16/2457* | (2019.01) |

(52) U.S. Cl.
CPC ....... *G06Q 30/0629* (2013.01); *G06F 3/0482* (2013.01); *G06F 16/248* (2019.01); *G06F 16/24578* (2019.01); *G06F 16/9535* (2019.01); *G06Q 30/0643* (2013.01); *H04L 67/02* (2013.01); *H04L 67/306* (2013.01)

(58) Field of Classification Search
CPC ....................................... G06Q 30/0601–0645
USPC .............................................. 705/26.1–27.2
See application file for complete search history.

(56) References Cited

U.S. PATENT DOCUMENTS

| | | | | |
|---|---|---|---|---|
| 9,830,635 | B1* | 11/2017 | Levy ................. | G06Q 30/0629 705/26.1 |
| 2006/0167757 | A1* | 7/2006 | Holden ................. | G06Q 30/06 705/27.2 |
| 2007/0073591 | A1* | 3/2007 | Perry ..................... | G06Q 30/02 705/26.64 |
| 2008/0215349 | A1* | 9/2008 | Baran .................... | G06Q 10/10 705/1.1 |

(Continued)

OTHER PUBLICATIONS

Dasgupta, P., & Melliar-Smith, P. (2003). Dynamic consumer profiling and tiered pricing using software agents. Electronic Commerce Research, 3(3-4), 277. (Year: 2003).*

*Primary Examiner* — Resha Desai
*Assistant Examiner* — Kennedy Gibson-Wynn
(74) *Attorney, Agent, or Firm* — Eversheds Sutherland (US) LLP

(57) ABSTRACT

Systems, methods, and computer-readable media are disclosed for server-based feature detection and generation of graphical representation of feature distinctions. In one embodiment, an example method may include determining a first product identifier for a first product, and determining a second product identifier for a second product that is an alternative to the first product. Certain example methods may include determining a first product difference between the first product and the second product, determining a second product difference between the first product and the second product, ranking the first product difference and the second product difference, generating a first graphical indicator for the first product and a second graphical indicator for the second product, the second graphical indicator comprising the first product difference, and presenting the first graphical indicator and the second graphical indicator in a graphical user interface.

20 Claims, 10 Drawing Sheets

(56) References Cited

U.S. PATENT DOCUMENTS

| | | | |
|---|---|---|---|
| 2010/0312724 A1* | 12/2010 | Pinckney | G06N 99/005 706/11 |
| 2011/0063317 A1* | 3/2011 | Gharaat | G09G 5/36 345/545 |
| 2015/0154685 A1* | 6/2015 | Pope | G06Q 30/0631 705/26.62 |

* cited by examiner

SERVER-BASED FEATURE DETECTION AND GENERATION OF GRAPHICAL REPRESENTATION OF FEATURE DISTINCTIONS

BACKGROUND

Product or service information may be presented in digital formats on digital devices. Product or service information may include information related to specific products or services, including technical specifications, dimensions, pricing, and other information related to a particular product. Manufacturers may release new products or services over time, and such new products or services may have different features than older products or services. Similarly, different types of products may have different functionality or features. For example, one digital camera may not have WiFi connectivity, while another digital camera, from the same manufacturer or a different manufacturer, may have WiFi connectivity. Conveying information related to distinguished product or service features, or features that may be available at other products or services, may assist consumers in making decisions.

Figure 1:
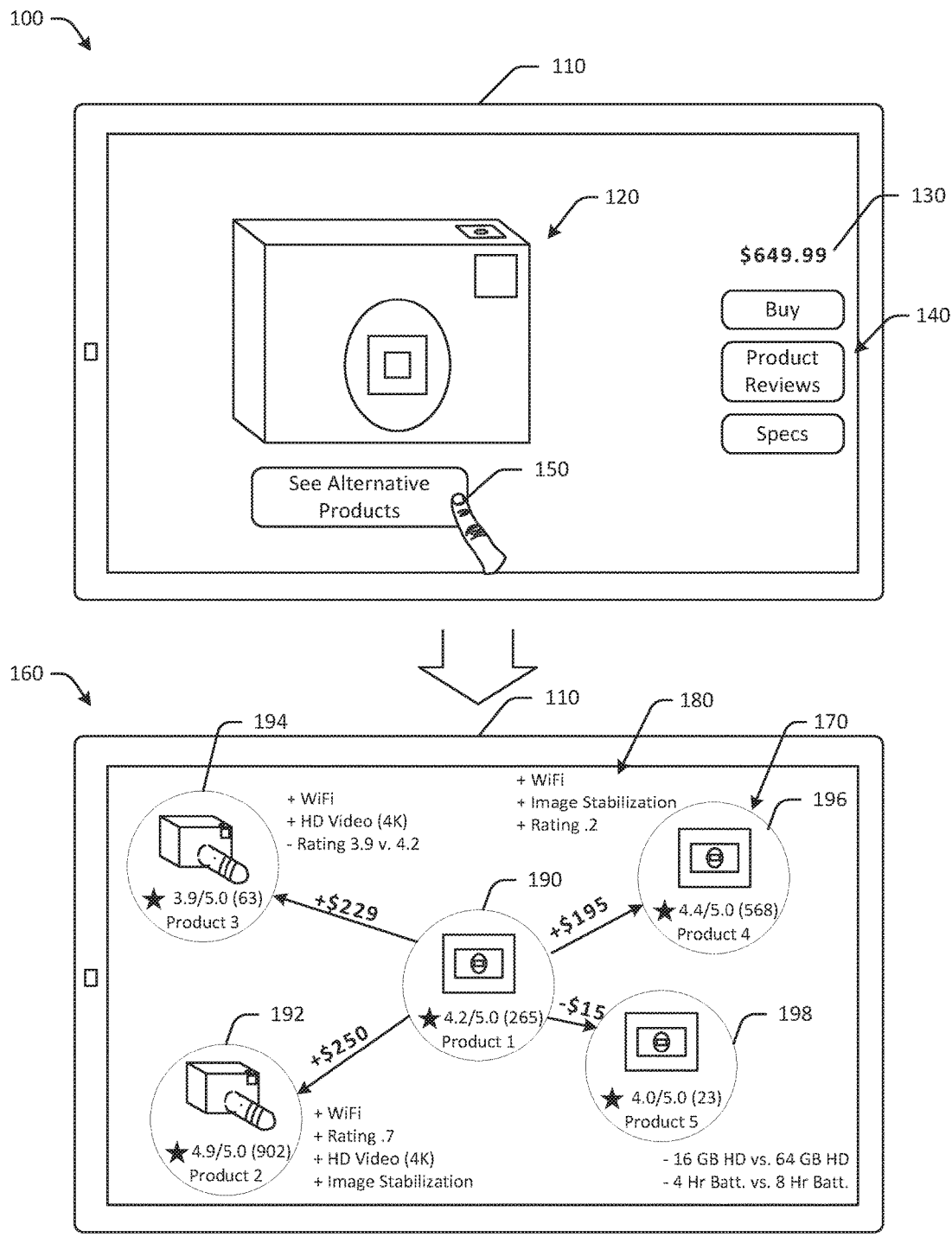
FIG. 1 is an example system diagram illustrating server-based feature detection and generation of graphical representation of feature distinctions in accordance with one or more embodiments of the disclosure.

The detailed description is set forth with reference to the accompanying drawings. The drawings are provided for purposes of illustration only and merely depict example embodiments of the disclosure. The drawings are provided to facilitate understanding of the disclosure and shall not be deemed to limit the breadth, scope, or applicability of the disclosure. The use of the same reference numerals indicates similar, but not necessarily the same or identical components. Different reference numerals may be used to identify similar components as well. Various embodiments may utilize elements or components other than those illustrated in the drawings, and some elements and/or components may not be present in various embodiments. The use of singular terminology to describe a component or element may, depending on the context, encompass a plural number of such components or elements and vice versa.

DETAILED DESCRIPTION

Overview

Information related to products or services may be digitally presented at electronic devices. For example, product features, such as technical specifications, dimensions, etc., user ratings, pricing, and other information may be presented in a digital format on a device display. Consumers may use the product features to determine whether to make a purchase of a particular product or service. However, in certain instances, product features may vary across different models or products. Similarly, user ratings, prices, and other product information may vary across different models or products. To make informed purchase decisions, consumers may desire to compare different product models, or different products, to determine feature differences or other product differences, such as user ratings and prices. However, such information may not be readily available or otherwise apparent to consumers, and as a result, consumers may purchase products or services without being aware of alternative features or options, or pricing differences, rating differences, and the like available for other related products or services.

This disclosure relates to, among other things, systems, methods, computer-readable media, techniques, and methodologies for server-based feature detection and generation of graphical representation of feature distinctions. Products and services may have one or more features. Different products, or different models of products, may have different features, and may also have different pricing and different product ratings, which may be ratings and/or reviews provided by users of the respective product. Different features may include features that are added or missing when comparing products. Embodiments of the disclosure may determine one or more differences between one or more products, including differences related to product features or functionality, prices, ratings, and other information related to products. The determined differences presented as one or more graphical indicators that may be formatted for specific device display properties and sizes. Graphical indicators may include product information and product differences between products, thereby allowing users to quickly discern not only features available at products that are alternatives to selected products, but also to determine related products that are available and that the user may be unaware of. By identifying alternative products, determining product differences, and presenting the product differences, embodiments of the disclosure may facilitate improved product selection by users by providing relevant information that can be consumed regardless of device display size.

Certain products may have more than one product difference. For example, a first product may be selected by a user with a first price and first user rating. Embodiments of the disclosure may identify or otherwise determine a second product as an alternative to the first product. The second product may be related to the first product. For example, the second product may be in the same product category (e.g., 9" tablets, etc.) as the first product. The second product may have a second price that is lower than the first price and a second rating that is higher than the first rating. Product differences or distinctions between the first product and the second product may therefore include a price difference and a rating difference. Embodiments of the disclosure may rank the product differences based at least in part on one or more of a number of factors. For example, product differences may be ranked based on feature importance, relative newness of a feature, search queries leading to presentation of either or both the first product or the second product, frequency of occurrence of features or related terms in product descriptions and user ratings or feedback, and other factors. In some embodiments, product differences may be ranked based at least in part on user-specific criteria. For example, if a user is determined to be price sensitive, a price difference may be a top-ranked product difference for the user, or a product difference that may most likely impact a user's decision to purchase a product. If a user is focused on quality and/or product ratings, as opposed to pricing, quality metrics or product ratings may be assigned a relatively greater weight value for the particular user, and pricing may be assigned a relatively lesser weight value. User preferences may be determined based at least in part on information received from a user and/or information associated with a user profile. In another example, if a manufacturer identifies a product feature as new, or as previously unavailable for a product, the identified feature may be a top-ranked product difference when comparing the new product to other products. Embodiments of the disclosure may utilize a weight-based metric to determine rankings of product differences, where weights may be assigned to each product difference.

One or more of the product differences may be presented at a graphical user interface. In some embodiments, the product differences may be presented as part of graphical indicators representing products and alternative products. A number of product differences that are presented may be based at least in part on a device display at which the graphical user interface is presented. For example, a relatively small display, such as a smartphone display, may present a fewer number of product differences between two products than a relatively large display, such as a television. The presented product differences may be the product differences that have a particular ranking or range of rankings, in embodiments where the product differences are ranked. For example, the top three product differences may be presented, while in other embodiments, the top ranked difference may be presented. The graphical user interface may indicate a selected product with a connector to one or more determined alternative products. The connector may indicate a difference between a selected product and an alternative product. For example, the connector may be an arrow, and a length of the arrow may correspond to a price difference between the selected product and an alternative product. Accordingly, embodiments of the disclosure may generate graphical user interfaces that convey timely and relevant information to facilitate user purchases.

Referring to FIG. 1, an example use case illustrating server-based feature detection and generation of graphical representation of feature distinctions is depicted. In the example of FIG. 1, at a first user interface 100, a user may use a user device 110 to select a product or service that the user is interested in or otherwise wishes to purchase. For example, the user may select a first camera 120. The first user interface 100 may present an image of the selected product, or the first camera 120. The first user interface 100 may also present pricing information 130 indicating a price for the first camera 120, as well as selectable options 140. The selectable options 140 may include, for example, a selectable option to buy the first camera, a selectable option to view product reviews, and a selectable option to see product specifications or features. Other embodiments may include additional, fewer, or different selectable options, or may not include selectable options.

The first user interface 100 may include an option to see alternative products 150. The option to see alternative products 150 may present alternative products at the user device 110, and may indicate product differences associated with respective alternative products. In the example of FIG. 1, a user may select the option to see alternative products 150. After the option to see alternative products 150 is selected, embodiments of the disclosure may determine one or more products that may be considered alternatives to the first camera 120. For example, alternative products may be determined or otherwise identified based at least in part on analysis of a product category associated with the first camera 120. In another example, alternative products may be identified based at least in part on analysis of a browse node associated with the first camera 120. A browse node may be represented as a set of product identifiers or webpages associated with a brand, a product/service, a type of product/service, etc.

Embodiments of the disclosure may identify or otherwise determine respective product features associated with a selected product and alternative products. Product features may include technical specifications, dimensions, product ratings, product reviews, prices, and other features. Product features may be determined based at least in part on analysis of product information, or may be determined by information received from a product manufacturer. Differences between product features of a selected product and product features of an alternative product may be determined. In one example, product differences may be determined by comparing product features. For example, if the first camera 120 has a 3" display, and an alternative product is a camera with a 4" display, a product difference may be determined to be a +1" display size for the alternative product, or a −1" display size for the first camera 120. Differences may be presented from a view point of the alternative product (e.g., the alternative product has +1" display size, etc.), or from the view point of the selected product (e.g., the selected product has −1" display size, etc.).

Certain products and alternative products may have more than one product difference. For example, the first camera 120 may have a 3" display and may not have built-in GPS functionality, whereas an alternative product may have a 4" display and may include built-in GPS functionality. In such instances, product differences may be ranked. Rankings may be used to determine which product differences may be important or may otherwise be most helpful in assisting a user in making a product selection for purchase. Rankings may be determined based at least in part on weights assigned to certain features. Weights may be adjustable and may be determined based at least in part on factors such as an identification source of the feature (e.g., features identified as new or important by a product manufacturer may be heavily weighted, etc.), a newness or previous unavailability of a feature, a frequency of occurrence of a particular feature or one or more keywords associated with a feature in product reviews, user ratings, product feedback, search queries for the product, news coverage, and the like, and other factors. In one example, logistic regression may be used to determine weight values for particular features or product differences. In some embodiments, rankings may be determined for particular users based at least in part on user-specific information, such as user preferences, user interests, previous purchase data, user search queries, and the like. For example, if a user is determined to be price sensitive based on previous purchase data, price may be determined to be the most important factor for the user, rather than new product features that are available at different products or models of products. Product differences may include not only feature distinctions, or differences in product features, but may also include differences such as price differences, rating differences, and the like.

Ranked features, and the related product differences, may be sorted to determine which product differences are to be presented. A number of product differences that are presented may be based at least in part on available display space and/or display size of a device. Accordingly, in some embodiments, only a top-ranked product difference may be presented, while in other embodiments, three or more product differences may be presented. Users may be able to view all product differences upon selecting a particular alternative product for comparison.

A second user interface 160 that includes one or more alternative products may be presented at the user device 110. Alternative products may be related to a selected product, such as the first camera 120, and may be products in the same or different product categories. In some embodiments, the alternative products may be presented at the first user interface 100. The second user interface 160 may include one or more alternative products that may be alternatives for the first camera 120. For example, alternative products may include different models of the first camera 120, different cameras, the same or different manufacturers, the same or different types of cameras (e.g., point-and-shoot vs. DSLR, etc.). Product difference information 180, such as feature distinctions, rating differences, pricing differences, and other information may be presented with respective alternative products. In some embodiments, the ranked product differences may be presented as the product difference information 180, with certain differences being presented based at least in part on a ranking of the difference.

In the example of FIG. 1, the first camera 120 may be represented as a graphical indicator and positioned at a center or middle of a product web 170. The product web 170 or product graph may be formed by individual graphical indicators for each alternative product. The graphical indicators may be connected by connectors, such as the arrows in FIG. 1. The connectors may be used to convey information, such as price differences or product rating differences. For example, the longer a connector, the greater the difference in price and/or product rating. The arrow connectors in the illustrated embodiment, may point from the selected product, or the first camera 120, to the alternative product, so as to indicate the product comparison. The second user interface 160 may be scrollable, moveable, or otherwise navigable any direction, so as to facilitate consumption of graphical indicators for particular products. The graphical user interface may be formatted for presentation on a number of different device displays, and scrolling functionality may vary based at least in part on a display size.

A first graphical indicator 190 of the product web 170 for the first camera 120 may indicate that the first camera has a product rating of 4.2/5.0 stars. A product rating may be an aggregate rating for the first camera 120 across one or more product reviews. The first graphical indicator 190 may also include an image of the first camera 120, as well as a product identifier. The first graphical indicator 190 may be selectable and may be hyperlinked to a product specific webpage for the first camera 120. Different embodiments may include additional or fewer, or different, information at graphical indicators.

A second graphical indicator 192 of the product web 170 may be for an alternative product, such as an alternative camera, labeled as "Product 2" in FIG. 1. The second graphical indicator 192 may be connected to the first graphical indicator 190 by an arrow connector, and a price difference of +$250 may be presented at or along the arrow connector. Because the alternative product is being compared to the selected product, the +$250 indicates that the alternative product has a price that is $250 greater than the selected product, or the first camera 120. The alternative product represented by the second graphical indicator 192 may have a product rating of 4.9/5.0 stars with 902 product reviews that may be provided by users of the product. Product difference information may be presented with the second graphical indicator 192. For example, the product difference information may indicate that the alternative product has WiFi functionality and that the first camera 120 does not (represented by the "+WiFi"), the alternative product has a product rating that is +0.7 stars greater than the first camera's rating, the alternative product has high definition video capability, such as 4K functionality, whereas the first camera 120 does not, and also that the alternative product has an image stabilization feature that is not found at the first camera 120. The product differences may be ranked based at least in part on importance of the feature, and in some embodiments, may be ranked based at least in part on estimated importance to a particular user. A user may select the second graphical indicator 192 to view product information and/or a complete list of product differences between the selected product and the alternative product.

A third graphical indicator 194 of the product web 170 may be for another alternative product labeled as "Product 3" in FIG. 1. The third graphical indicator 194 may be connected to the first graphical indicator 190 by another arrow connector, and a price difference of +$229 may be presented at or along the arrow connector. The alternative product represented by the third graphical indicator 194 may have a product rating of 3.9/5.0 stars with 63 product reviews. Product difference information may be presented with the third graphical indicator 194. For example, the product difference information may indicate that the alternative product has WiFi functionality and that the first camera 120 does not, the alternative product has high definition video capability, such as 4K functionality, whereas the first camera 120 does not, and that the alternative product has a product rating that is—0.3 stars less than the first camera's rating (indicated by—Rating 3.9 vs. 4.2). A user may select the third graphical indicator 194 to view product information and/or a complete list of product differences between the selected product and the alternative product.

A fourth graphical indicator 196 of the product web 170 may be for another alternative product labeled as "Product 4" in FIG. 1. The fourth graphical indicator 196 may be connected to the first graphical indicator 190 by another arrow connector, and a price difference of +$195 may be presented at or along the arrow connector. The alternative product represented by the fourth graphical indicator 196 may have a product rating of 4.4/5.0 stars with 568 product reviews. Product difference information may be presented with the fourth graphical indicator 196. For example, the product difference information may indicate that the alternative product has WiFi functionality and that the first camera 120 does not, the alternative product has image stabilization capability, whereas the first camera 120 does not, and that the alternative product has a product rating that is +0.2 stars greater than the first camera's rating (indicated by +Rating 0.2). A user may select the fourth graphical indicator 196 to view product information and/or a complete list of product differences between the selected product and the alternative product.

A fifth graphical indicator 198 of the product web 170 may be for another alternative product labeled as "Product 5." The fifth graphical indicator 198 may be connected to the first graphical indicator 190 by another arrow connector, and a price difference of −$15 may be presented at or along the arrow connector, indicating that the alternative product is $15 cheaper than the selected product, or the first camera 120. The alternative product represented by the fifth graphical indicator 198 may have a product rating of 4.0/5.0 stars with 23 product reviews.

Product difference information may be presented with the fifth graphical indicator 198. For example, the product difference information may indicate that the alternative product has a smaller memory storage than the selected product (indicated by the—16 GB HD vs. 64 GB HD, meaning that the alternative product has storage of 16 GB rather than 64 GB included in the first camera), and that the alternative product has a shorter battery life than the first camera (indicated by the—4 hrs. battery life vs. 8 hrs. battery life). Product differences may be presented as comparisons (e.g., 4 hr. battery life vs. 8 hr. battery life, etc.), by simply identifying an additional or missing feature (e.g., +WiFi, −1" display size, etc.), or in another suitable manner. In some embodiments, positive product differences may be presented by identifying the feature, while negative product differences may be presented by comparison. A user may select the fifth graphical indicator 198 to view product information and/or a complete list of product differences between the selected product and the alternative product.

The product web 170 presented at the second user interface 160 may be consumed by a user to quickly determine whether alternative products have desired features, and/or whether alternative products are available within a certain price difference. Using the information presented, users may make informed decisions related to purchases of products or services. Because the user interfaces may be formatted and/or created with functionality specific to particular devices and/or display sizes, the user interfaces can be presented at any suitable device. In some embodiments, a number of available pixels may be determined in order to determine, for example, a length of a connector, a size of a graphical indicator, or for another purpose related to generation of, and/or presentation of, the product web or graphical user interface.

By generating the product web and related graphical user interfaces, embodiments of the disclosure may present specific and relevant information in real-time that can be used to facilitate ordering and/or shipment of products and services. A rate of product returns or exchanges may be reduced, as users may make more informed decisions by consuming the user interfaces generated by embodiments of the disclosure. As a result, ease of use, product shipping and handling costs, and user experiences may be improved.

The systems, methods, computer-readable media, techniques, and methodologies for server-based feature detection and generation of graphical representation of feature distinctions may result in improved user interfaces that may be formatted for different devices and that may have functionality that varies based at least in part on a device type and/or display size.

Example embodiments of the disclosure provide a number of technical features or technical effects. For example, in accordance with example embodiments of the disclosure, certain embodiments of the disclosure may determine product differences, including feature differences, price differences, rating differences, and the like. Product differences may be ranked by importance, which may be user-specific, or based at least in part on a number of factors. The determined information may be presented at a number of displays and/or devices and may be configured to facilitate consumption by users in short time periods. Embodiments of the disclosure may automatically adjust user interface functionality based at least in part on device-specific parameters. The above examples of technical features and/or technical effects of example embodiments of the disclosure are merely illustrative and not exhaustive.

One or more illustrative embodiments of the disclosure have been described above. The above-described embodiments are merely illustrative of the scope of this disclosure and are not intended to be limiting in any way. Accordingly, variations, modifications, and equivalents of embodiments disclosed herein are also within the scope of this disclosure. The above-described embodiments and additional and/or alternative embodiments of the disclosure will be described in detail hereinafter through reference to the accompanying drawings.

Illustrative Processes and Use Cases

Figure 2:
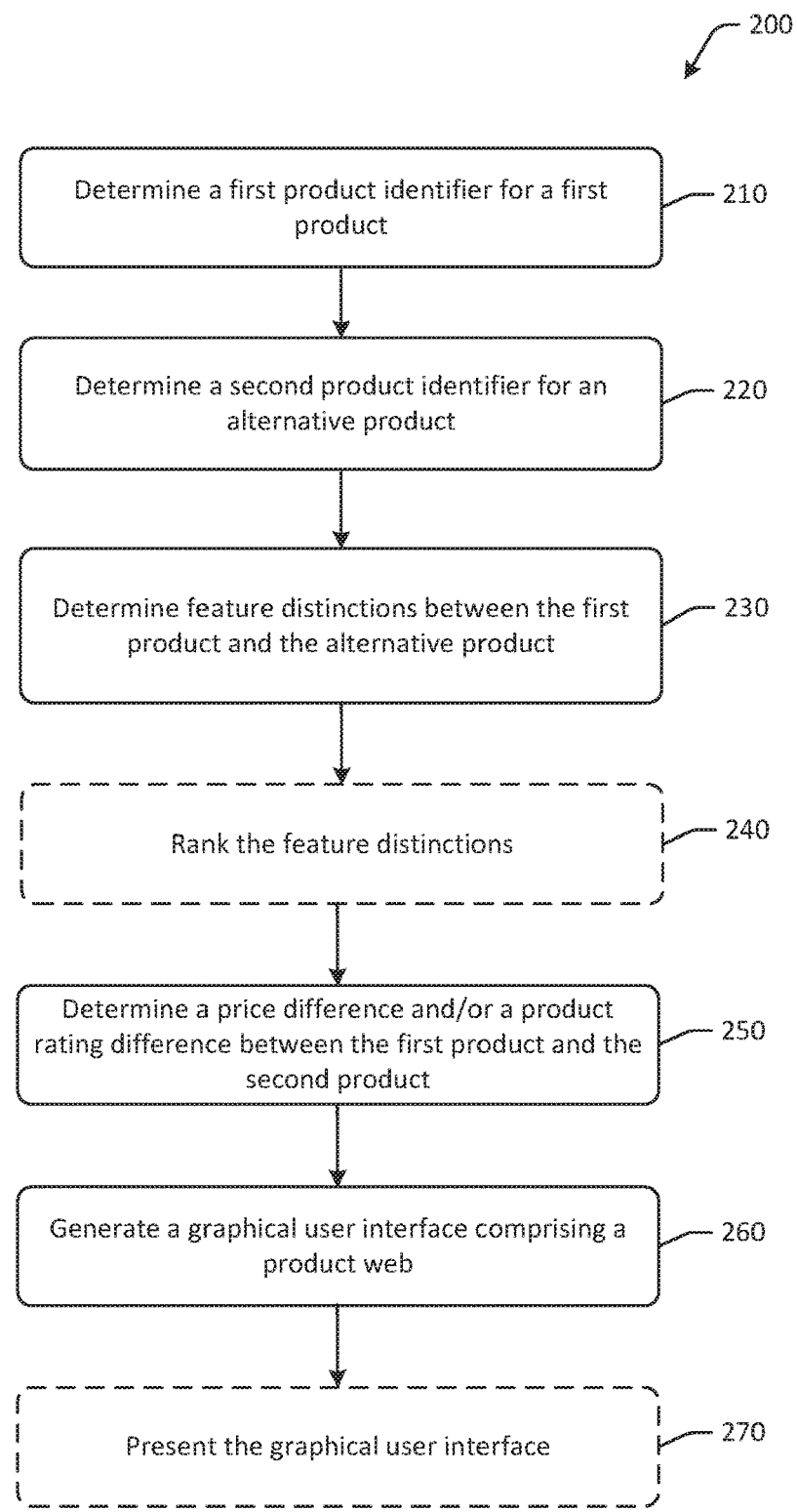
FIG. 2 is an example process flow diagram for server-based feature detection and generation of graphical representation of feature distinctions in accordance with one or more embodiments of the disclosure.
Figure 3:
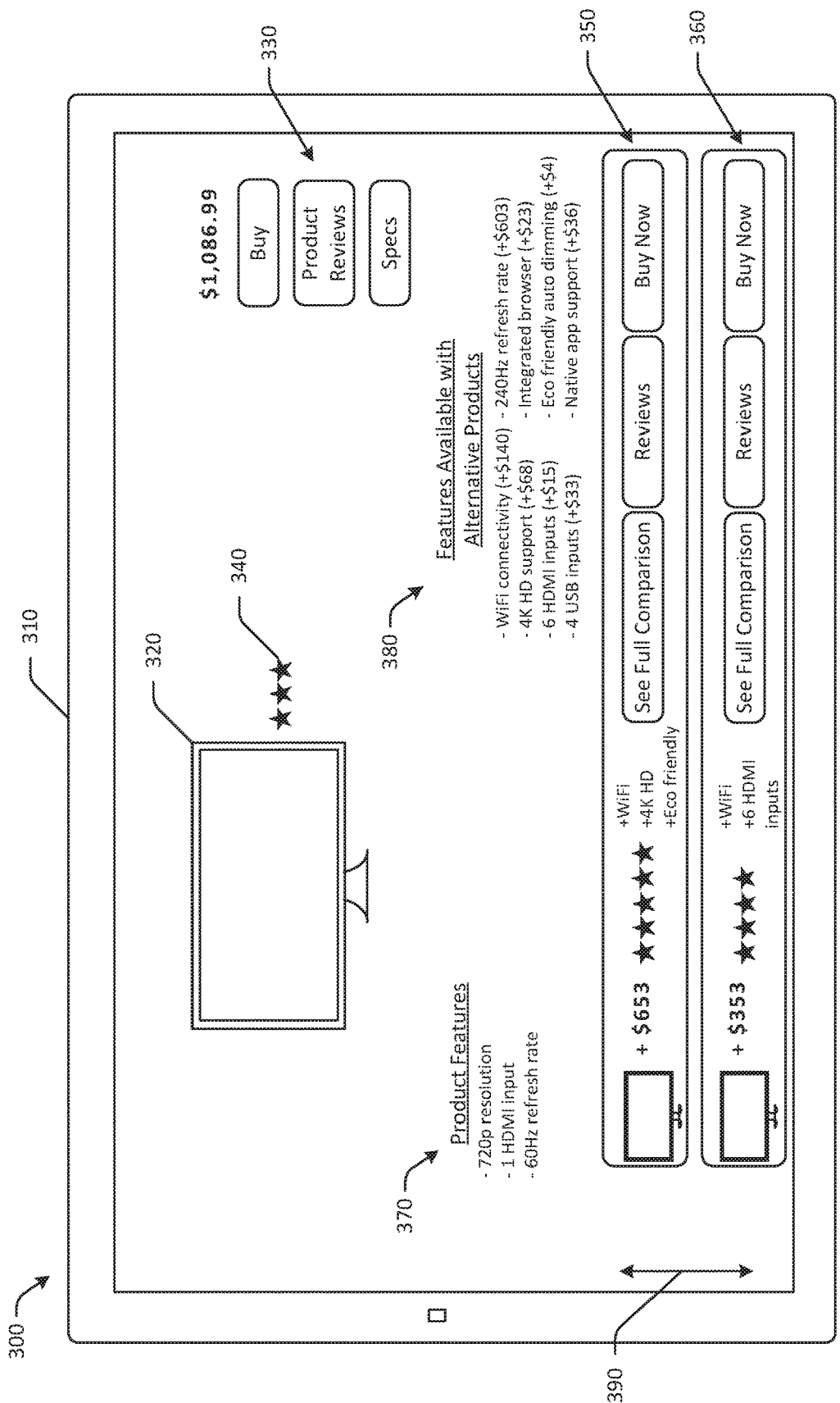
FIG. 3 is an example graphical user interface with graphical representations of feature distinctions in accordance with one or more example embodiments of the disclosure.

Referring to FIGS. 2-9, an example process flow 200 for server-based feature detection and generation of graphical representation of feature distinctions in accordance with one or more embodiments of the disclosure is depicted in FIG. 2. Although certain operations are illustrated as occurring separately in FIG. 2, some or all of the operations may occur concurrently or partially concurrently across one or more computer systems. FIG. 3 illustrates an example graphical user interface with graphical representations of feature distinctions in accordance with one or more example embodiments of the disclosure, and will be discussed in conjunction with FIG. 2.

At block 210 of the process flow 200, a first product identifier for a first product is determined. For example, computer-executable instructions of one or more product identification module(s) stored at a remote server may be executed to determine a first product identifier for a first product. The first product may be a selected product that may be selected by a user. The user may be interested in purchasing the first product. In some embodiments, a product category identifier for the first product may be determined.

In FIG. 3, a user interface 300 may be presented at a device 310. The user interface 300 may be a webpage, an application screen, or another digital interface. The user interface 300 may include a first product identifier or a first product 320, which may be a television. The user interface 300 may include selectable options 300 related to purchasing the television or for additional information for the television, as well as a product rating 340, which may be a score or value representing feedback or product reviews provided by users.

Block 220 of the process flow 200 includes determining or identifying a second product identifier for an alternative product. For example, computer-executable instructions of one or more product identification module(s) stored at a remote server may be executed to determine a second product identifier for a second product that is an alternative to the first product. The second product may be related to the first product. For example, the second product may be made by the same manufacturer as the first product, or may be in the same product category as the first product, or may be a different model of the first product, and the like. In some embodiments, the second product may be in a different product category or may be a different type of product than the first product. For example, the second product may be a DSLR camera, while the first product is a point-and-shoot camera. Alternative products may be identified based at least in part on product category similarity, search query information, browse node analysis, and other factors. In one example, an alternative product may be identified by determining a manufacturer identifier of a manufacturer of the first product, and determining that a second product is associated with the manufacturer identifier. In another example, an alternative product may be identified by determining a first product category identifier associated with the first product identifier and identifying a second product identifier associated with the first product category identifier.

In FIG. 3, a first alternative product 350 may be identified as another television, and a second alternative product 360 may be identified as a different television. The first alternative product 350 and the second alternative product 360 may be made by the same or different manufacturers than the first product 320. In some embodiments, users may be able to restrict identification of alternative products to specific brands or manufacturers.

Block 230 includes determining feature distinctions between the first product and the alternative product. For example, computer-executable instructions of one or more product identification module(s) stored at a remote server may be executed to determine feature distinctions between the first product and the alternative product. Feature distinctions may include features that are different between the first product and the alternative product, and/or features that are missing or present at either the first product or the alternative product. In one example, feature distinctions may be determined by determining a first set of features associated with the first product, and determining a second set of features associated with the second product. The first set of features and the second set of features may be compared. Based at least in part on the comparison, a set of one or more distinguished features may be determined. The set of distinguished features may include features in the second set of features that are distinguished from the first set of features, or features in the first set of features that are distinguished from the second set of features.

In FIG. 3, a first set of one or more features 370 may be determined for the first product 320. The first set of features 370 may include 720p resolution, 1 HDMI input, and a 60 Hz refresh rate. While certain features are presented in the user interface 300 as part of the first set of features 370, the first product 320 may have additional features. Features associated with the first alternative product 350 and the second alternative product 360 may be determined and compared, respectively, to the first set of features 370 to determine respective feature distinctions. For example, as shown in FIG. 3, the first alternative product 350 may have feature distinctions that include a WiFi feature, a 4k HD compatibility feature, and an eco-friendly feature that are not present in the first product 320. The second alternative product 360 may have feature distinctions that include a WiFi feature and 6 HDMI inputs, as opposed to the 1 HDMI input at the first product 320. Options to see full feature and/or product difference comparisons, see product reviews, or to purchase the alternative products may be presented. In some embodiments, a set of available features 380 that are available at other products may be presented at the user interface 300, so as to alert users to feature availability. For example, features available at alternative products for the first product 320 may include WiFi connectivity, 4k HD support, 6 HDMI inputs, 4 USB inputs, 240 Hz refresh rate, an integrated browser, ecofriendly auto dimming, and native app support. Individual features may be associated with a change in cost (e.g., minimum, maximum, average, etc.) for the feature. For example, WiFi connectivity may be obtained for at least an additional cost of $140.

At optional block 240 in FIG. 2, the feature distinctions may be ranked. For example, computer-executable instructions of one or more feature ranking module(s) stored at a remote server may be executed to rank one or more feature distinctions, or features that are different between products. In some embodiments, feature distinctions may be ranked in conjunction with product differences, such as price differences and/or rating differences. Feature distinctions may be ranked based at least in part on an importance of a particular feature. Importance may be determined based at least in part on general factors, or importance may be determined specific to a certain user. For example, certain features may be more important to certain users than others. In one example, feature distinctions and/or product differences may be ranked based on a newness or previous unavailability of a particular feature. For example, a manufacturer may identify a certain feature as new for a particular product. Such features may be top-ranked or heavily weighted, as the features may be important and users may not be aware of the feature availability. For example, in FIG. 3, WiFi functionality may be a manufacturer-indicated new feature or a previously unavailable feature for a particular product, product type, product category, manufacturer, and the like, and may therefore be a top-ranked or highest-ranked feature for the first alternative product 350 and the second alternative product 360.

In another example, feature distinctions and/or product differences may be ranked by assigning weight values to particular feature distinctions and/or product differences. For example, a first weight for a first feature distinction and/or product difference may be determined, and a second weight for a second feature distinction and/or product difference may be determined. Weights may be based at least in part on an identification source of a feature, in one example. For instance, a manufacturer-identified new feature may be given a relatively higher weight than a feature distinction determined from analysis of user comments or reviews. In another example, embodiments of the disclosure may determine a product category identifier associated with a first product identifier and a second product identifier, and may determine manufacturer provided information for products associated with the product category identifier. Manufacturer provided information may include product features for different product models in the product category associated with the product category identifier. Using the manufacturer provided information, embodiments of the disclosure may determine a first new feature in the second product that is not found in the first product. Embodiments may determine that the first new feature is present in a threshold number of products associated with the product category identifier, and may determine that the first new feature should be ranked higher than, or over, a feature distinction or improvement for a feature that was previously available. Accordingly, users may be informed of newly available features.

Weights may be generated for feature distinctions and/or product differences based on a frequency of occurrence of one or more keywords associated with a particular feature or a product difference that appear in product reviews or ratings. For example, if the keywords "cordless" and "WiFi" appear frequently in product reviews for a product, then WiFi functionality may be determined to be a relatively important feature, and may therefore be allocated an appropriate weight. Weighted features and/or product differences may be sorted or ranked by weight values. Some or all of the ranked features and/or product differences may be presented based at least in part on weight values.

Feature distinctions and/or product differences may be ranked based at least in part on a frequency of occurrence of one or more terms or keywords associated with the particular feature or product difference. Certain embodiments may determine a first frequency of occurrence of first terms associated with a product difference in product reviews that associated with a first product and/or a second product. For example, if terms such as "great battery" and "lasts forever" appear frequently in product reviews, battery life may be determined to be a relatively important feature, and may therefore be assigned a higher weight value and/or ranking. In some embodiments, feature distinctions may be ranked based at least in part on a frequency of occurrence of terms or keywords associated with the particular feature in the product reviews, manufacturer provided information, or related documentation. In one example, a frequency of occurrence may be determined by parsing text in the user reviews and identifying words or groups of words that correspond to a particular feature.

Frequency of occurrence for one or more keywords in search queries may also be determined, in some embodiments, to determine rankings and/or weight values. For example, if search queries for a camera frequently include "WiFi camera" or "GPS camera," the WiFi and GPS may be determined to be relatively important features. Weight values for features may be determined based at least in part on frequency of occurrence for keywords of features in search queries associated with particular products, product reviews of certain products, manufacturer provided information, or a combination thereof, as well as other factors.

Block 250 includes determining a price difference and/or a product rating difference between the first product and the second product. For example, computer-executable instructions of one or more feature distinction module(s) stored at a remote server may be executed to determine a first price for the first product and a second price for the second product. A price difference may be calculated using the first price and the second price. Similarly, a first product rating value for the first product and a second product rating value for the second product may be determined and compared to determine a product rating difference. The product rating difference may be determined alphanumerically or graphically (e.g., +/−0.2, +1 star, etc.). Price differences, product rating differences, a number of ratings or reviews associated with a product, and the like may be referred to as product differences.

In FIG. 3, a price of $1,086.99 may be determined for the first product 320, and may be compared to a price for the first alternative product 350. A resulting price difference of +$653 may be determined and presented as part of a graphical indicator for the first alternative product 350. Similarly, the price of the first product may be compared to a price for the second alternative product 360, with a resulting price difference for the second alternative product 360 of +$353, which may be presented at the graphical indicator for the second alternative product 360. Product ratings for the first alternative product 350 and the second alternative product 360 may be presented at the respective graphical indicators, as shown in FIG. 3. In some embodiments, rating differences may be determined and/or presented, instead of individual product ratings.

Block 260 includes generating a graphical user interface comprising a product web. For example, computer-executable instructions of one or more graphical user interface module(s) stored at a remote server may be executed to generate a graphical user interface. Some embodiments may include a product web, while other embodiments may include a product graph, a product chart, or another form of graphical indicators. To generate a graphical user interface, embodiments of the disclosure may determine a device type and device display configuration and related properties, such as a number of available pixels, a screen size, and the like. Based at least in part on the device type and the device display configuration, the graphical user interface may be formatted accordingly. In some embodiments, a portion of the graphical user interface, such as a primary graphical indicator, may remain stationary or in a fixed position while a secondary graphical indicator, such as that for an alternative product, may be moveable or scrollable using the graphical user interface.

The graphical user interface may include one or more graphical indicators, which may be product description graphics including images, for products and alternative products. The graphical indicators may be associated with respective product differences and may be connected, in some embodiments. In other embodiments, the graphical indicators may not be connected. Graphical connectors may be used to indicate which product is newer and/or has more product features, for example via arrows and the like. Respective sizes of graphical indicators may vary and may be based at least in part on one or more of a popularity of a particular product, a product rating, a number of reviews, and the like.

At optional block 270, the graphical user interface may be presented. For example, computer-executable instructions of one or more graphical user interface rendering module(s) stored at a remote server may be executed to render the graphical user interface at a device. Presentation may include presenting the product, alternative products, price differences, product rating differences, etc. in the graphical user interface. Selection of graphical indicators or product description graphic may result in redirection to a product webpage.

As shown in FIG. 3, the user interface 300 may be presented at the device 310, and may be formatted for presentation on the device 310. The user interface 300 may be scrollable 390 in one or more directions. One or more portions of the user interface 300 may be fixed, while other portions may be scrollable or otherwise navigable. For example, the first product 320 and related information may be static, while the alternative product graphical indicators may be scrollable or placed in a carousel.

Figure 4:
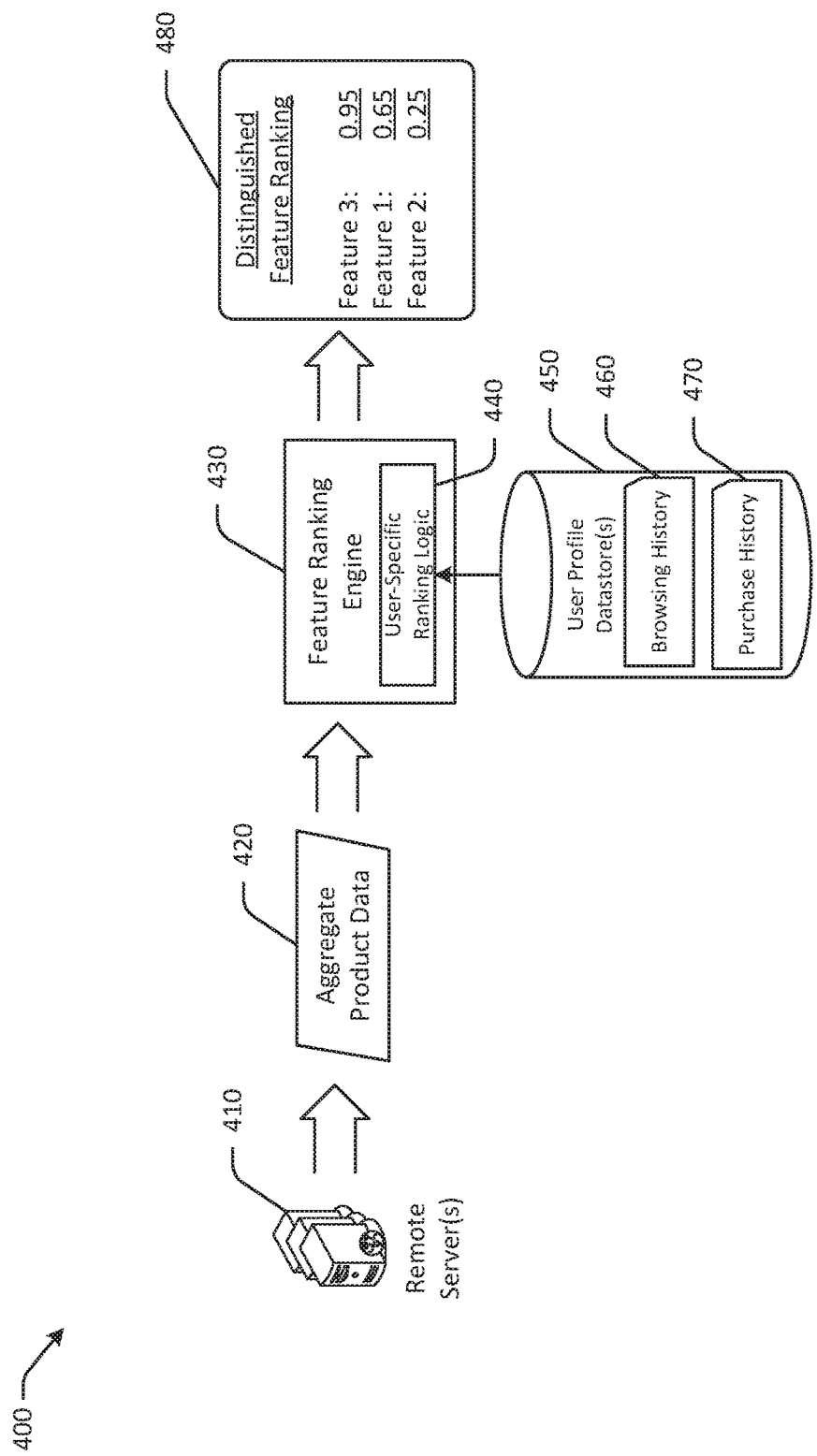
FIG. 4 is an example hybrid system and process flow diagram for feature detection and ranking in accordance with one or more embodiments of the disclosure.

FIG. 4 depicts an example hybrid system and process flow diagram 400 for feature detection and ranking in accordance with one or more embodiments of the disclosure. One or more remote server(s) 410 may be used to determine aggregate product data 420. Aggregate product data may include search queries that were used to find certain products, purchase data, related product information (e.g., features, specifications, etc.), product ratings, product reviews, product categories, and other product information.

The aggregate product data 420 may be sent or otherwise fed to a feature ranking engine 430. The feature ranking engine 430 may be configured to rank one or more features, feature distinctions, or product differences. Rankings may be weight-based and based at least in part on aggregate product data 420.

The feature ranking engine 430 may include user-specific ranking logic 440, which may be used to rank features or product differences for a specific user. Accordingly, the feature ranking engine 430 may be in communication with one or more user profile datastores 450, which may include browsing history 460 for the user, as well as a purchase history 470 for the user. Using information provided by the user profile datastore 450, the feature ranking engine 430 may determine an adjustment to feature rankings based at least in part on an estimated feature importance, as determined by the feature ranking engine 430.

In one example, the browsing history 460 may include historical search data, such as specific user search queries or other online context, associated with a user profile. The feature ranking engine 430 may determine that the historical search data includes a keyword associated with a particular product difference, such as "WiFi" or "GPS." A frequency of occurrence of the keyword(s) may be determined, and if a threshold value is satisfied, a weight for the particular feature may be adjusted.

The feature ranking engine 430 may generate distinguished feature rankings 480, which may include feature identifiers and respective weighted values. The feature rankings may reflect an estimated importance of the features. For example, Feature 3 may have a weight of 0.95, Feature 1 may have a weight of 0.65, and Feature 2 may have a weight of 0.25. If only a top-ranked feature or highest-ranked feature is to be presented, only Feature 3 may be presented. For user-specific rankings, Feature 3 may be a feature that the user specifically is expected to believe is important.

Figure 5:
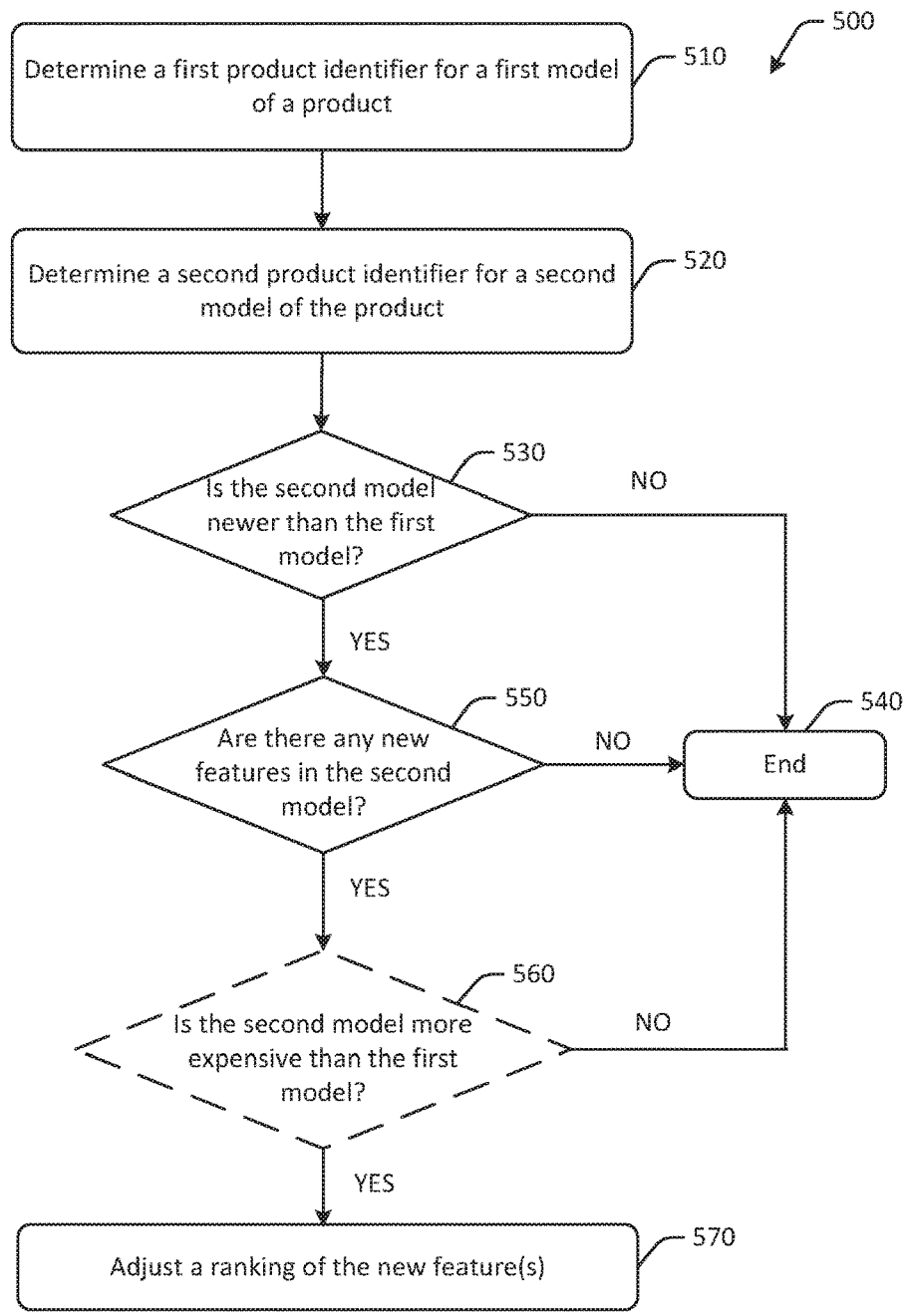
FIG. 5 is an example process flow diagram for determining feature importance in accordance with one or more embodiments of the disclosure.

Referring to FIG. 5, an example process flow 500 for determining feature importance in accordance with one or more embodiments of the disclosure. At block 510, a first product identifier for a first model of a product is identified. At block 520, a second product identifier for a second model of the product is identified.

At determination block 530, a determination is made, for example by one or more modules stored at a remote server, as to whether the second model is newer than the first model. The determination may be made based at least in part on a product release date, a model number, or another metric. If it is determined that the second product is not newer than the first product, the process flow 500 ends at block 540.

If it is determined at determination block 530 that the second model is newer than the first model, the process flow 500 proceeds to determination block 550, at which a determination is made as to whether there are any new features in the second model. The determination may be made based at least in part on manufacturer provided information, reviews, product materials, and the like. If it is determined that there are no new features in the second model, the process flow 500 may end at block 540.

If it is determined at determination block 550 that the second model has new features, the process flow 500 may proceed to optional determination block 560, at which a determination is made as to whether the second model is more expensive than the first model. The determination may be based at least in part on a price of the first model and a price of the second model. If it is determined that the second model is not more expensive than the first model, the process flow 500 may end at block 540.

If it is determined at optional determination block 560 that the second model is more expensive than the first model, the process flow 500 may proceed to block 570, at which a ranking of the new feature(s) may be adjusted. The adjustment may be an increase in weight, as the feature is a manufacturer-supplied or identified new feature with an optional corresponding price increase, which may indicate importance of the feature.

Figure 6:
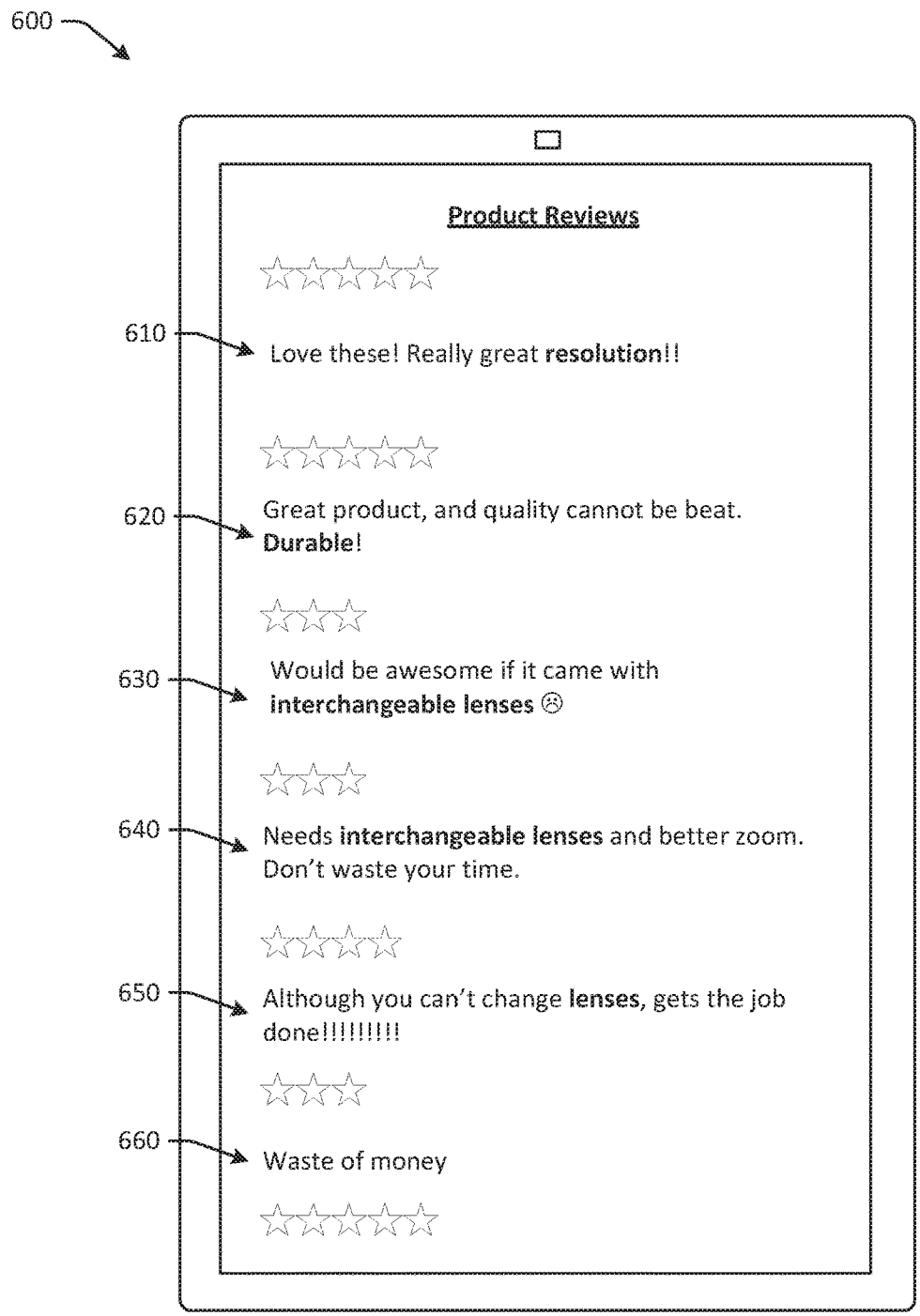
FIG. 6 is an example user interface in accordance with one or more example embodiments of the disclosure.

FIG. 6 is an example user interface 600 of product reviews in accordance with one or more example embodiments of the disclosure. Product reviews for a product may include a rating value, which may be represented numerically, graphically, or the like. For example, a rating value may be 4.0/10.0, or 4 stars out of 10 stars. Frequency of occurrence of keywords in product reviews may be determined by mining and/or parsing reviews to determine presence of keywords that are associated with features.

For example, a first product review 610 may include a first keyword "resolution," which may indicate importance of a resolution. A second product review 620 may include a second keyword of "durable," a third product review 630 may include a third set of keywords of "interchangeable lenses," a fourth product review 640 may include the third set of keywords of "interchangeable lenses," a fifth product review 650 may include a fourth keyword of "lenses," which may correspond to the keywords of the third product review 630 and the fourth product review 640, and a sixth product review 660 may not include any keywords. Keywords, while illustrated in bold in the example of FIG. 6, may not be presented with any enhancements.

A frequency of occurrence for one or more of the identified keywords may be determined across all product reviews for a product and/or an alternative product, and may be used to determine a weight for the related feature. For example, in FIG. 6, because "lenses" appears three times in six reviews, interchangeable lenses may be determined to be an important feature, and may therefore be assigned a higher ranking than resolution, which only occurred once in six reviews.

Figure 7:
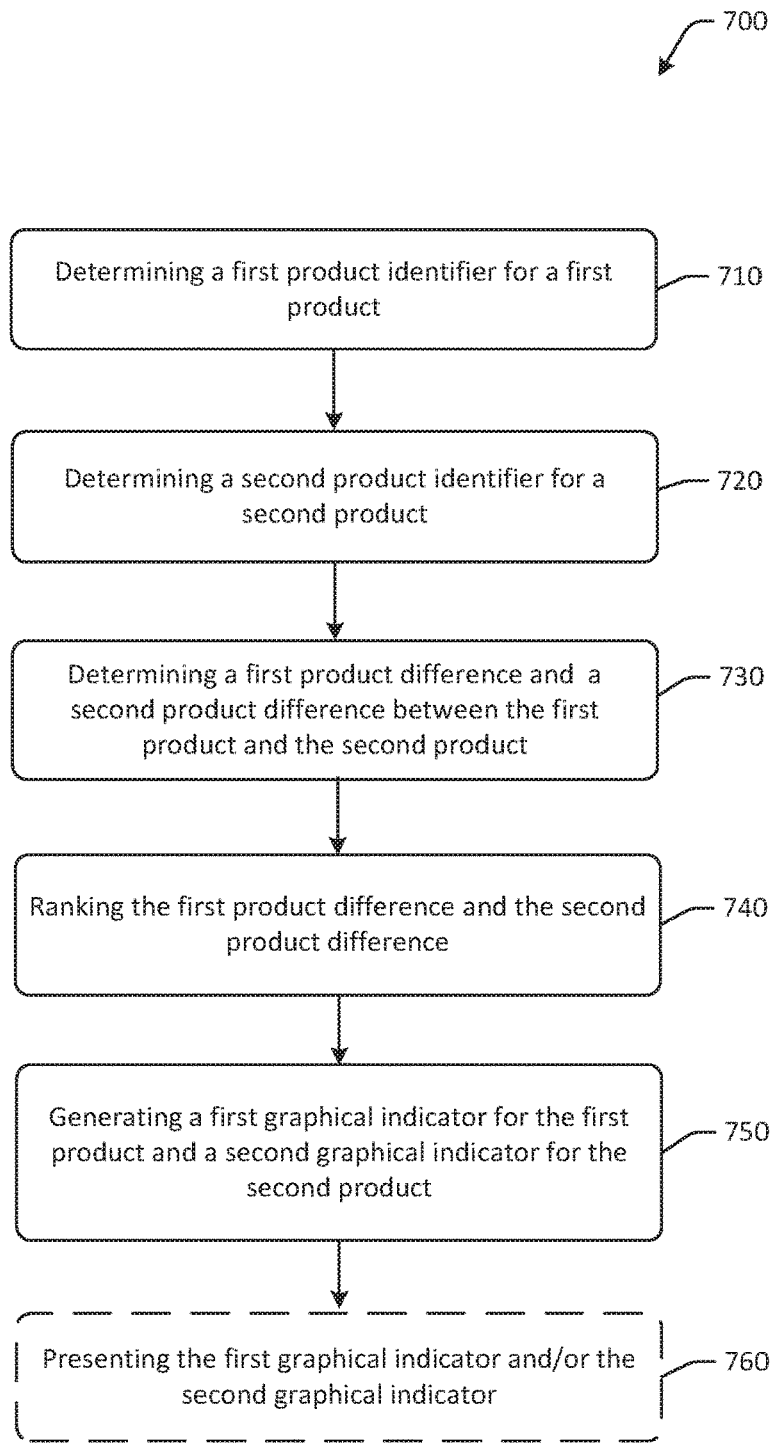
FIG. 7 is an example process flow diagram for server-based feature detection and generation of graphical representation of feature distinctions in accordance with one or more embodiments of the disclosure.

FIG. 7 depicts an example process flow 700 for server-based feature detection and generation of graphical representation of feature distinctions in accordance with one or more embodiments of the disclosure. At block 710 of the process flow 700, a first product identifier for a first product is determined. At block 720, a second product identifier for a second product is determined. At block 730, a first product difference and a second product difference between the first product and the second product is determined. Product differences may be feature differences or distinctions, ratings differences, price differences, and the like. At block 740, the first product difference and the second product difference may be ranked. Ranking may be based at least in part on an importance of the respective product difference and may be user-specific in some embodiments. At block 750, a first graphical indicator for the first product and a second graphical indicator for the second product are generated. The graphical indicators may include the product differences. At optional block 760, the first graphical indicator and the second graphical indicator are presented.

Figure 8:
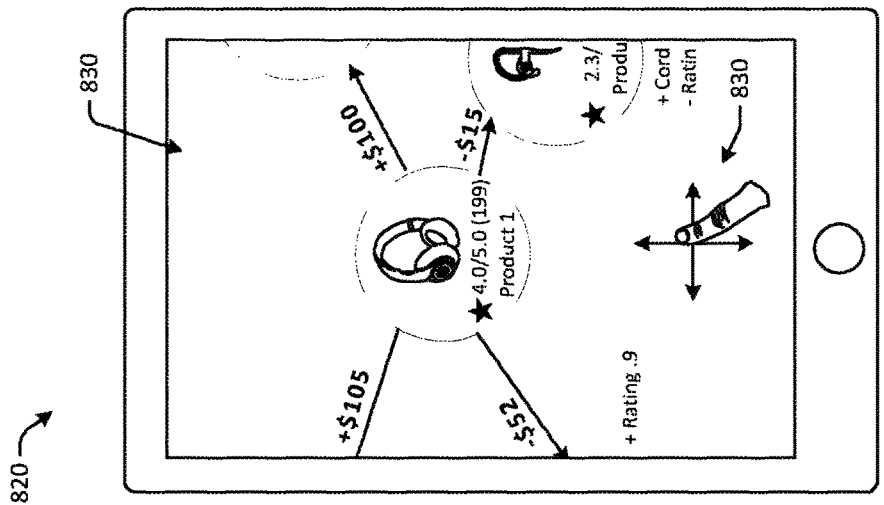
FIG. 8 depicts a number of scrollable graphical indicators and user interfaces in accordance with one or more example embodiments of the disclosure.
Figure 8:
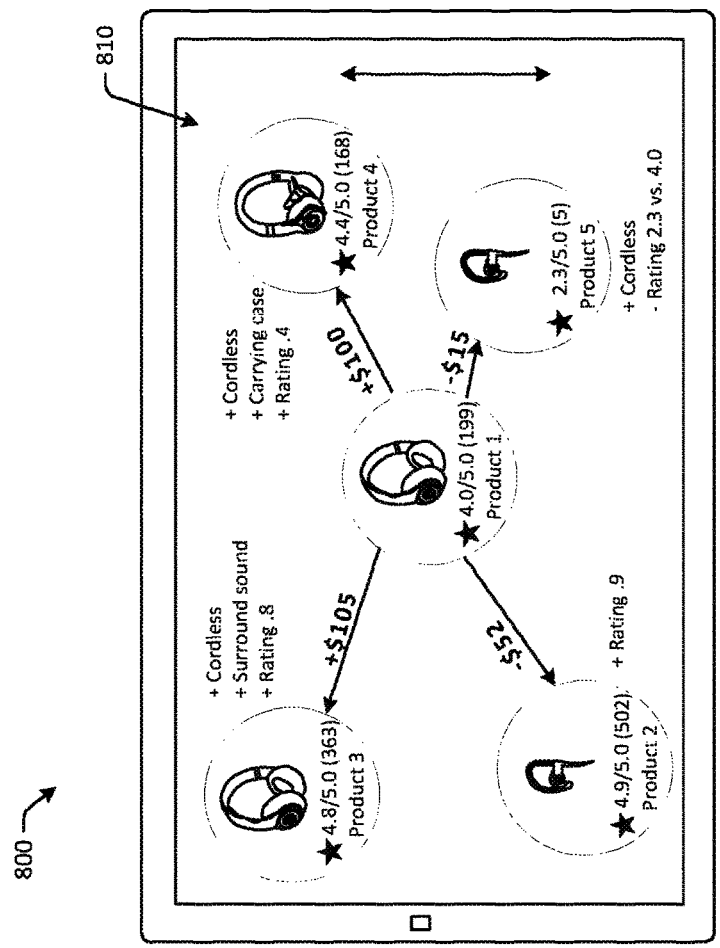

FIG. 8 depicts a number of scrollable graphical indicators and user interfaces in accordance with one or more example embodiments of the disclosure. At a first device 800, a first graphical user interface 810 may be presented that is formatted and generated based at least in part on device properties and display configuration. For example, the first graphical user interface 810 may present five graphical indicators with up to three product differences. The connectors between graphical indicators, as well as a size of the graphical indicators and inclusion of images, may be sized based at least in part on a number of pixels available at the first device 800. The same information may be formatted differently for presentation at a second device 820 in a second graphical user interface 830. As shown in FIG. 8, the second device 820 may have a reduced screen size compared to the first device 800, and may therefore present a portion of the user interface. A user may scroll in any direction using a touchscreen functionality of the second device 820.

Figure 9:
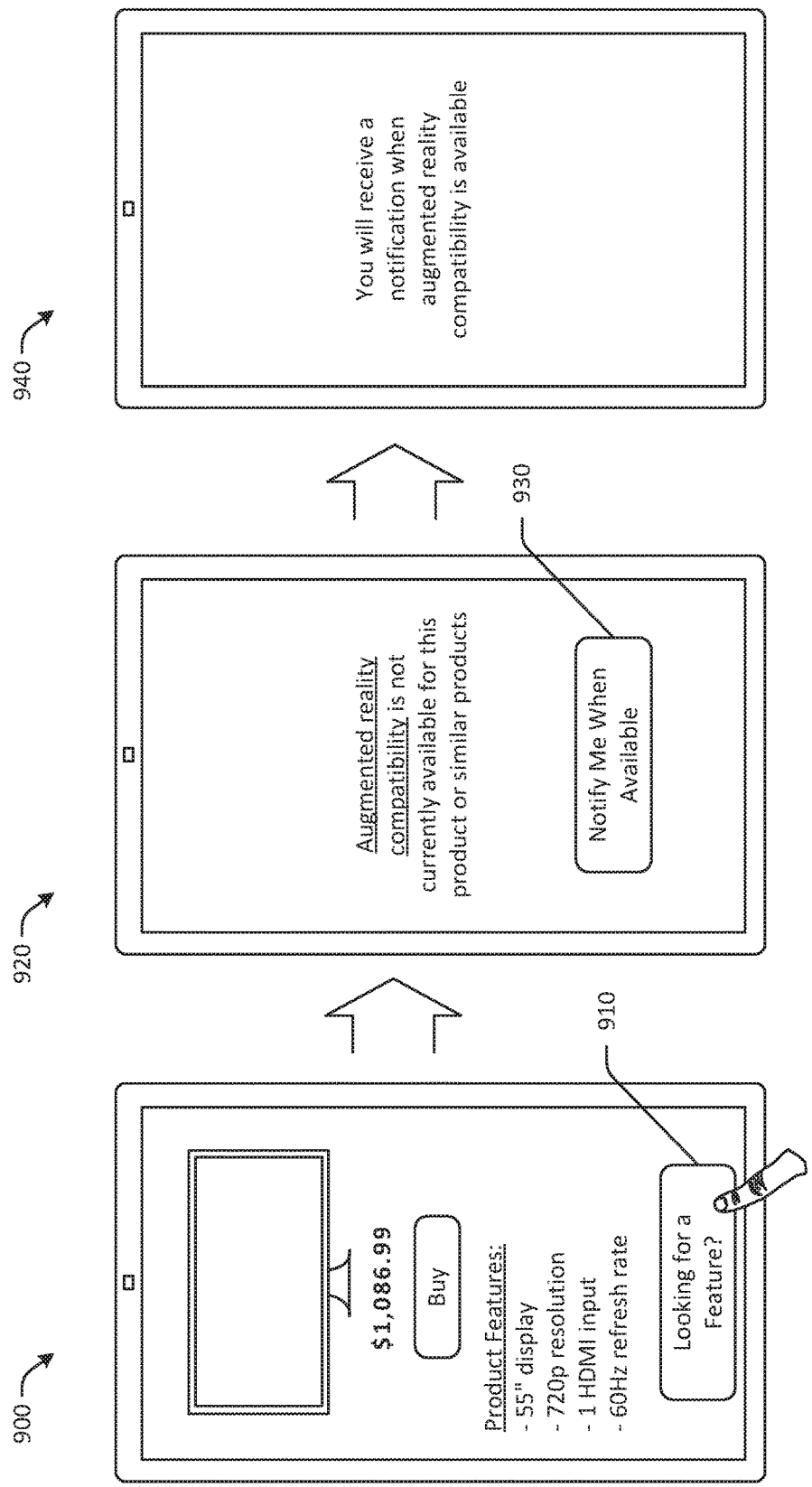
FIG. 9 depicts example user interfaces for feature-based availability functionality in accordance with one or more example embodiments of the disclosure.

FIG. 9 depicts example user interfaces for feature-based availability functionality in accordance with one or more example embodiments of the disclosure. At a first user interface 900, product information may be presented at a device. A first selectable option 910 labeled "looking for a feature?" may allow users to search by or for devices with specific features. At a second user interface 920, availability information may be presented. For example, information conveying that an augmented reality capability is not currently available for any related products. A second selectable option 930 of "notify me when available" may be presented. If selected, a third user interface 940 may be presented indicating that when the desired feature is available at the product or at a related or alternative product, a notification will be sent to the user, for example, via email, text message, mobile app notification, or another notification. Users may therefore track availability of product features and receive notifications as desired features become available. User lists for users interested in particular features may be used as marketing lists when such features become available.

One or more operations of the method, process flows, or use cases of FIGS. 1-9 may have been described above as being performed by a user device, or more specifically, by one or more program module(s), applications, or the like executing on a device. It should be appreciated, however, that any of the operations of methods, process flows, or use cases of FIGS. 1-9 may be performed, at least in part, in a distributed manner by one or more other devices, or more specifically, by one or more program module(s), applications, or the like executing on such devices. In addition, it should be appreciated that processing performed in response to execution of computer-executable instructions provided as part of an application, program module, or the like may be interchangeably described herein as being performed by the application or the program module itself or by a device on which the application, program module, or the like is executing. While the operations of the methods, process flows, or use cases of FIGS. 1-9 may be described in the context of the illustrative devices, it should be appreciated that such operations may be implemented in connection with numerous other device configurations.

The operations described and depicted in the illustrative methods, process flows, and use cases of FIGS. 1-9 may be carried out or performed in any suitable order as desired in various example embodiments of the disclosure. Additionally, in certain example embodiments, at least a portion of the operations may be carried out in parallel. Furthermore, in certain example embodiments, less, more, or different operations than those depicted in FIGS. 1-9 may be performed.

Although specific embodiments of the disclosure have been described, one of ordinary skill in the art will recognize that numerous other modifications and alternative embodiments are within the scope of the disclosure. For example, any of the functionality and/or processing capabilities described with respect to a particular device or component may be performed by any other device or component. Further, while various illustrative implementations and architectures have been described in accordance with embodiments of the disclosure, one of ordinary skill in the art will appreciate that numerous other modifications to the illustrative implementations and architectures described herein are also within the scope of this disclosure.

Certain aspects of the disclosure are described above with reference to block and flow diagrams of systems, methods, apparatuses, and/or computer program products according to example embodiments. It will be understood that one or more blocks of the block diagrams and flow diagrams, and combinations of blocks in the block diagrams and the flow diagrams, respectively, may be implemented by execution of computer-executable program instructions. Likewise, some blocks of the block diagrams and flow diagrams may not necessarily need to be performed in the order presented, or may not necessarily need to be performed at all, according to some embodiments. Further, additional components and/or operations beyond those depicted in blocks of the block and/or flow diagrams may be present in certain embodiments.

Accordingly, blocks of the block diagrams and flow diagrams support combinations of means for performing the specified functions, combinations of elements or steps for performing the specified functions, and program instruction means for performing the specified functions. It will also be understood that each block of the block diagrams and flow diagrams, and combinations of blocks in the block diagrams and flow diagrams, may be implemented by special-purpose, hardware-based computer systems that perform the specified functions, elements or steps, or combinations of special-purpose hardware and computer instructions.

Illustrative Computer Architecture

Figure 10:
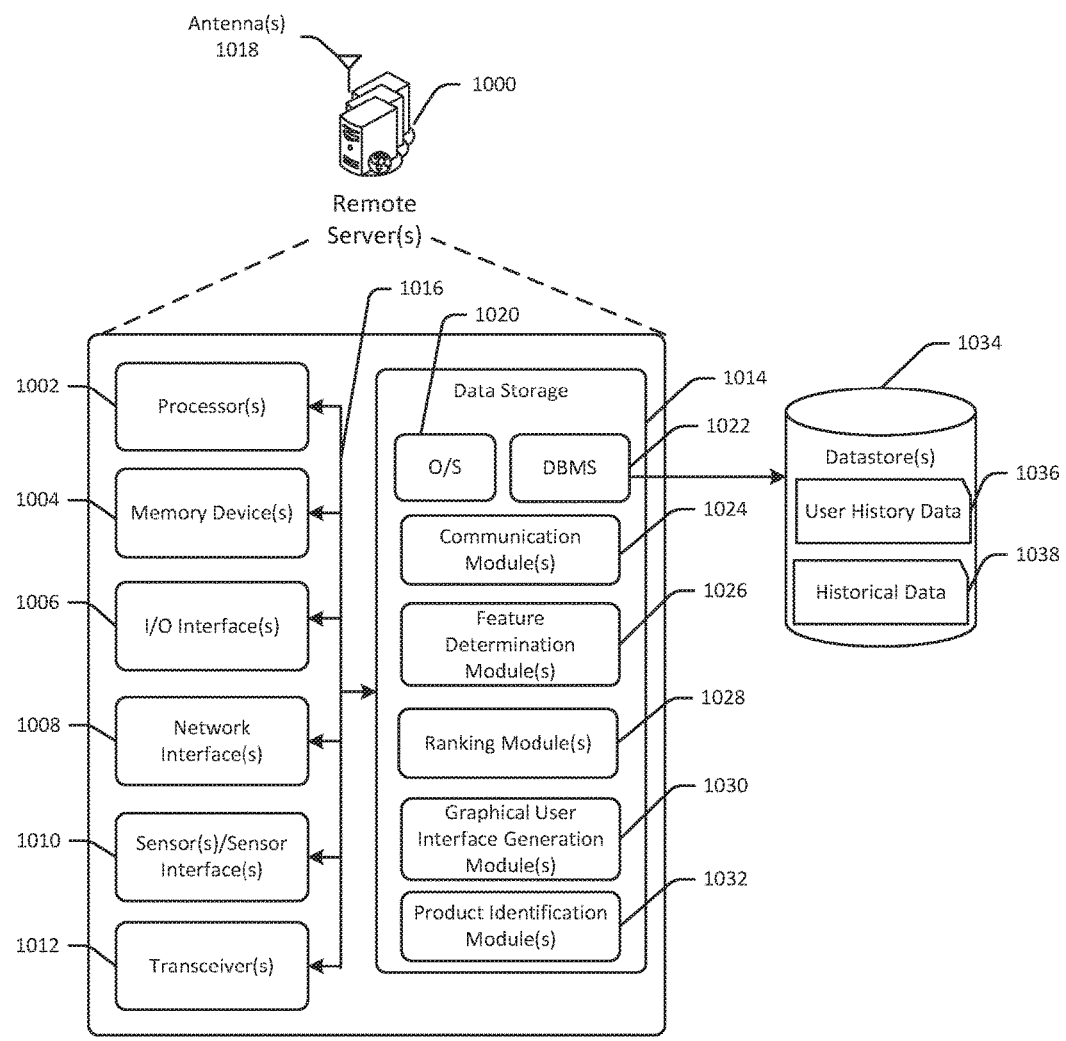
FIG. 10 schematically illustrates an example architecture of a system in accordance with one or more embodiments of the disclosure.

FIG. 10 is a schematic block diagram of one or more illustrative remote server(s) 1000 in accordance with one or more example embodiments of the disclosure. The remote server(s) 1000 may include any suitable computing device capable of receiving and/or generating audio including, but not limited to, a server system, a mobile device such as a smartphone, tablet, e-reader, wearable device, or the like; a desktop computer; a laptop computer; a content streaming device; a set-top box; or the like. The remote server(s) 1000 may correspond to an illustrative device configuration for the campaign management servers of FIGS. 1-9.

The remote server(s) 1000 may be configured to communicate via one or more networks with one or more servers, user devices, or the like. The remote server(s) 1000 may be configured to actively or passively manage one or more aspects of a content campaign, such as content delivery parameters. The remote server(s) 1000 may be configured to deliver one or more pieces of content and may further be configured to engage in a bidding process for auctions to present content. In some embodiments, a single remote server or single group of remote servers may be configured to perform more than one type of content delivery functionality.

The remote server(s) 1000 may be configured to communicate via one or more networks. Such network(s) may include, but are not limited to, any one or more different types of communications networks such as, for example, cable networks, public networks (e.g., the Internet), private networks (e.g., frame-relay networks), wireless networks, cellular networks, telephone networks (e.g., a public switched telephone network), or any other suitable private or public packet-switched or circuit-switched networks. Further, such network(s) may have any suitable communication range associated therewith and may include, for example, global networks (e.g., the Internet), metropolitan area networks (MANs), wide area networks (WANs), local area networks (LANs), or personal area networks (PANs). In addition, such network(s) may include communication links and associated networking devices (e.g., link-layer switches, routers, etc.) for transmitting network traffic over any suitable type of medium including, but not limited to, coaxial cable, twisted-pair wire (e.g., twisted-pair copper wire), optical fiber, a hybrid fiber-coaxial (HFC) medium, a microwave medium, a radio frequency communication medium, a satellite communication medium, or any combination thereof.

In an illustrative configuration, the remote server(s) 1000 may include one or more processors (processor(s)) 1002, one or more memory devices 1004 (generically referred to herein as memory 1004), one or more input/output ("I/O") interface(s) 1006, one or more network interface(s) 1008, one or more sensors or sensor interface(s) 1010, one or more transceivers 1012, and data storage 1014. The remote server(s) 1000 may further include one or more buses 1016 that functionally couple various components of the remote server(s) 1000. The remote server(s) 1000 may further include one or more antenna(e) 1018 that may include, without limitation, a cellular antenna for transmitting or receiving signals to/from a cellular network infrastructure, an antenna for transmitting or receiving Wi-Fi signals to/from an access point (AP), a Global Navigation Satellite System (GNSS) antenna for receiving GNSS signals from a GNSS satellite, a Bluetooth antenna for transmitting or receiving Bluetooth signals, a Near Field Communication (NFC) antenna for transmitting or receiving NFC signals, and so forth. These various components will be described in more detail hereinafter.

The bus(es) 1016 may include at least one of a system bus, a memory bus, an address bus, or a message bus, and may permit exchange of information (e.g., data (including computer-executable code), signaling, etc.) between various components of the remote server(s) 1000. The bus(es) 1016 may include, without limitation, a memory bus or a memory controller, a peripheral bus, an accelerated graphics port, and so forth. The bus(es) 1016 may be associated with any suitable bus architecture including, without limitation, an Industry Standard Architecture (ISA), a Micro Channel Architecture (MCA), an Enhanced ISA (EISA), a Video Electronics Standards Association (VESA) architecture, an Accelerated Graphics Port (AGP) architecture, a Peripheral Component Interconnects (PCI) architecture, a PCI-Express architecture, a Personal Computer Memory Card International Association (PCMCIA) architecture, a Universal Serial Bus (USB) architecture, and so forth.

The memory 1004 of the remote server(s) 1000 may include volatile memory (memory that maintains its state when supplied with power) such as random access memory (RAM) and/or non-volatile memory (memory that maintains its state even when not supplied with power) such as read-only memory (ROM), flash memory, ferroelectric RAM (FRAM), and so forth. Persistent data storage, as that term is used herein, may include non-volatile memory. In certain example embodiments, volatile memory may enable faster read/write access than non-volatile memory. However, in certain other example embodiments, certain types of non-volatile memory (e.g., FRAM) may enable faster read/write access than certain types of volatile memory.

In various implementations, the memory 1004 may include multiple different types of memory such as various types of static random access memory (SRAM), various types of dynamic random access memory (DRAM), various types of unalterable ROM, and/or writeable variants of ROM such as electrically erasable programmable read-only memory (EEPROM), flash memory, and so forth. The memory 1004 may include main memory as well as various forms of cache memory such as instruction cache(s), data cache(s), translation lookaside buffer(s) (TLBs), and so forth. Further, cache memory such as a data cache may be a multi-level cache organized as a hierarchy of one or more cache levels (L1, L2, etc.).

The data storage 1014 may include removable storage and/or non-removable storage including, but not limited to, magnetic storage, optical disk storage, and/or tape storage. The data storage 1014 may provide non-volatile storage of computer-executable instructions and other data. The memory 1004 and the data storage 1014, removable and/or non-removable, are examples of computer-readable storage media (CRSM) as that term is used herein.

The data storage 1014 may store computer-executable code, instructions, or the like that may be loadable into the memory 1004 and executable by the processor(s) 1002 to cause the processor(s) 1002 to perform or initiate various operations. The data storage 1014 may additionally store data that may be copied to memory 1004 for use by the processor(s) 1002 during the execution of the computer-executable instructions. Moreover, output data generated as a result of execution of the computer-executable instructions by the processor(s) 1002 may be stored initially in memory 1004, and may ultimately be copied to data storage 1014 for non-volatile storage.

More specifically, the data storage 1014 may store one or more operating systems (O/S) 1020; one or more database management systems (DBMS) 1022; and one or more program module(s), applications, engines, computer-executable code, scripts, or the like such as, for example, one or more communication module(s) 1024, one or more feature determination module(s) 1026, one or more ranking module(s) 1028, one or more graphical user interface generation module(s) 1030, and/or one or more product identification module(s) 1032. Some or all of these module(s) may be sub-module(s). Any of the components depicted as being stored in data storage 1014 may include any combination of software, firmware, and/or hardware. The software and/or firmware may include computer-executable code, instructions, or the like that may be loaded into the memory 1004 for execution by one or more of the processor(s) 1002. Any of the components depicted as being stored in data storage 1014 may support functionality described in reference to correspondingly named components earlier in this disclosure.

The data storage 1014 may further store various types of data utilized by components of the remote server(s) 1000. Any data stored in the data storage 1014 may be loaded into the memory 1004 for use by the processor(s) 1002 in executing computer-executable code. In addition, any data depicted as being stored in the data storage 1014 may potentially be stored in one or more datastore(s) and may be accessed via the DBMS 1022 and loaded in the memory 1004 for use by the processor(s) 1002 in executing computer-executable code. The datastore(s) may include, but are not limited to, databases (e.g., relational, object-oriented, etc.), file systems, flat files, distributed datastores in which data is stored on more than one node of a computer network, peer-to-peer network datastores, or the like. In FIG. 10, an example datastore(s) 1034 may include, for example, user history data 1036, historical data 1038, and other information.

The processor(s) 1002 may be configured to access the memory 1004 and execute computer-executable instructions loaded therein. For example, the processor(s) 1002 may be configured to execute computer-executable instructions of the various program module(s), applications, engines, or the like of the remote server(s) 1000 to cause or facilitate various operations to be performed in accordance with one or more embodiments of the disclosure. The processor(s) 1002 may include any suitable processing unit capable of accepting data as input, processing the input data in accordance with stored computer-executable instructions, and generating output data. The processor(s) 1002 may include any type of suitable processing unit including, but not limited to, a central processing unit, a microprocessor, a Reduced Instruction Set Computer (RISC) microprocessor, a Complex Instruction Set Computer (CISC) microprocessor, a microcontroller, an Application Specific Integrated Circuit (ASIC), a Field-Programmable Gate Array (FPGA), a System-on-a-Chip (SoC), a digital signal processor (DSP), and so forth. Further, the processor(s) 1002 may have any suitable microarchitecture design that includes any number of constituent components such as, for example, registers, multiplexers, arithmetic logic units, cache controllers for controlling read/write operations to cache memory, branch predictors, or the like. The microarchitecture design of the processor(s) 1002 may be capable of supporting any of a variety of instruction sets.

Referring now to functionality supported by the various program module(s) depicted in FIG. 10, the communication module(s) 1024 may include computer-executable instructions, code, or the like that responsive to execution by one or more of the processor(s) 1002 may perform functions including, but not limited to, communicating with remote servers, communicating with remote datastores, sending or receiving notifications, and the like.

The feature determination module(s) 1026 may include computer-executable instructions, code, or the like that responsive to execution by one or more of the processor(s) 1002 may perform functions including, but not limited to, identifying product features, identifying product differences, determining feature distinctions, and the like.

The ranking module(s) 1028 may include computer-executable instructions, code, or the like that responsive to execution by one or more of the processor(s) 1002 may perform functions including, but not limited to, determining rankings for one or more features, feature distinctions, product differences, and the like.

The graphical user interface generation module(s) 1030 may include computer-executable instructions, code, or the like that responsive to execution by one or more of the processor(s) 1002 may perform functions including, but not limited to, identifying device properties, determining user interface formatting, determining graphical indicator contents and formatting, and the like.

The product identification module(s) 1032 may include computer-executable instructions, code, or the like that responsive to execution by one or more of the processor(s) 1002 may perform functions including, but not limited to, determining products and alternatives, exploring browse nodes, identifying product reviews and ratings, and the like.

Referring now to other illustrative components depicted as being stored in the data storage 1014, the O/S 1020 may be loaded from the data storage 1014 into the memory 1004 and may provide an interface between other application software executing on the remote server(s) 1000 and hardware resources of the remote server(s) 1000. More specifically, the O/S 1020 may include a set of computer-executable instructions for managing hardware resources of the remote server(s) 1000 and for providing common services to other application programs (e.g., managing memory allocation among various application programs). In certain example embodiments, the O/S 1020 may control execution of the other program module(s) to dynamically enhance characters for content rendering. The O/S 1020 may include any operating system now known or which may be developed in the future including, but not limited to, any server operating system, any mainframe operating system, or any other proprietary or non-proprietary operating system.

The DBMS 1022 may be loaded into the memory 1004 and may support functionality for accessing, retrieving, storing, and/or manipulating data stored in the memory 1004 and/or data stored in the data storage 1014. The DBMS 1022 may use any of a variety of database models (e.g., relational model, object model, etc.) and may support any of a variety of query languages. The DBMS 1022 may access data represented in one or more data schemas and stored in any suitable data repository including, but not limited to, databases (e.g., relational, object-oriented, etc.), file systems, flat files, distributed datastores in which data is stored on more than one node of a computer network, peer-to-peer network datastores, or the like. In those example embodiments in which the remote server(s) 1000 is a mobile device, the DBMS 1022 may be any suitable light-weight DBMS optimized for performance on a mobile device.

Referring now to other illustrative components depicted as being stored in the data storage 1014, the O/S 1020 may be loaded from the data storage 1014 into the memory 1004 and may provide an interface between other application software executing on the remote server(s) 1000 and hardware resources of the remote server(s) 1000. More specifically, the O/S 1020 may include a set of computer-executable instructions for managing hardware resources of the remote server(s) 1000 and for providing common services to other application programs (e.g., managing memory allocation among various application programs). In certain example embodiments, the O/S 1020 may control execution of one or more of the program module(s) depicted as being stored in the data storage 1014. The O/S 1020 may include any operating system now known or which may be developed in the future including, but not limited to, any server operating system, any mainframe operating system, or any other proprietary or non-proprietary operating system.

The DBMS 1022 may be loaded into the memory 1004 and may support functionality for accessing, retrieving, storing, and/or manipulating data stored in the memory 1004 and/or data stored in the data storage 1014. The DBMS 1022 may use any of a variety of database models (e.g., relational model, object model, etc.) and may support any of a variety of query languages. The DBMS 1022 may access data represented in one or more data schemas and stored in any suitable data repository. In certain example embodiments, the DBMS 1022 may be any suitable light-weight DBMS optimized for performance on a mobile device.

Referring now to other illustrative components of the remote server(s) 1000, the input/output (I/O) interface(s) 1006 may facilitate the receipt of input information by the remote server(s) 1000 from one or more I/O devices as well as the output of information from the remote server(s) 1000 to the one or more I/O devices. The I/O devices may include any of a variety of components such as a display or display screen having a touch surface or touchscreen; an audio output device for producing sound, such as a speaker; an audio capture device, such as a microphone; an image and/or video capture device, such as a camera; a haptic unit; and so forth. Any of these components may be integrated into the remote server(s) 1000 or may be separate. The I/O devices may further include, for example, any number of peripheral devices such as data storage devices, printing devices, and so forth.

The I/O interface(s) 1006 may also include an interface for an external peripheral device connection such as universal serial bus (USB), FireWire, Thunderbolt, Ethernet port or other connection protocol that may connect to one or more networks. The I/O interface(s) 1006 may also include a connection to one or more of the antenna(e) 1018 to connect to one or more networks via a wireless local area network (WLAN) (such as Wi-Fi) radio, Bluetooth, and/or a wireless network radio, such as a radio capable of communication with a wireless communication network such as a Long Term Evolution (LTE) network, WiMAX network, 3G network, etc.

The remote server(s) 1000 may further include one or more network interface(s) 1008 via which the remote server(s) 1000 may communicate with any of a variety of other systems, platforms, networks, devices, and so forth. The network interface(s) 1008 may enable communication, for example, with one or more wireless routers, one or more host servers, one or more web servers, and the like via one or more of networks.

The antenna(e) 1018 may include any suitable type of antenna depending, for example, on the communications protocols used to transmit or receive signals via the antenna(e) 1018. Non-limiting examples of suitable antennas may include directional antennas, non-directional antennas, dipole antennas, folded dipole antennas, patch antennas, multiple-input multiple-output (MIMO) antennas, or the like. The antenna(e) 1018 may be communicatively coupled to one or more transceivers 1012 or radio components to which or from which signals may be transmitted or received.

As previously described, the antenna(e) 1018 may include a cellular antenna configured to transmit or receive signals in accordance with established standards and protocols, such as Global System for Mobile Communications (GSM), 3G standards (e.g., Universal Mobile Telecommunications System (UMTS), Wideband Code Division Multiple Access (W-CDMA), CDMA2000, etc.), 4G standards (e.g., Long-Term Evolution (LTE), WiMax, etc.), direct satellite communications, or the like.

The antenna(e) 1018 may additionally, or alternatively, include a Wi-Fi antenna configured to transmit or receive signals in accordance with established standards and protocols, such as the IEEE 1002.11 family of standards, including via 2.4 GHz channels (e.g. 1002.11b, 1002.11g, 1002.11n), 5 GHz channels (e.g. 1002.11n, 1002.11ac), or 60 GHZ channels (e.g. 1002.11ad). In alternative example embodiments, the antenna(e) 1018 may be configured to transmit or receive radio frequency signals within any suitable frequency range forming part of the unlicensed portion of the radio spectrum.

The antenna(e) 1018 may additionally, or alternatively, include a GNSS antenna configured to receive GNSS signals from three or more GNSS satellites carrying time-position information to triangulate a position therefrom. Such a GNSS antenna may be configured to receive GNSS signals from any current or planned GNSS such as, for example, the Global Positioning System (GPS), the GLONASS System, the Compass Navigation System, the Galileo System, or the Indian Regional Navigational System.

The transceiver(s) 1012 may include any suitable radio component(s) for—in cooperation with the antenna(e) 1018—transmitting or receiving radio frequency (RF) signals in the bandwidth and/or channels corresponding to the communications protocols utilized by the remote server(s) 1000 to communicate with other devices. The transceiver(s) 1012 may include hardware, software, and/or firmware for modulating, transmitting, or receiving—potentially in cooperation with any of antenna(e) 1018—communications signals according to any of the communications protocols discussed above including, but not limited to, one or more Wi-Fi and/or Wi-Fi direct protocols, as standardized by the IEEE 1002.11 standards, one or more non-Wi-Fi protocols, or one or more cellular communications protocols or standards. The transceiver(s) 1012 may further include hardware, firmware, or software for receiving GNSS signals. The transceiver(s) 1012 may include any known receiver and baseband suitable for communicating via the communications protocols utilized by the remote server(s) 1000. The transceiver(s) 1012 may further include a low noise amplifier (LNA), additional signal amplifiers, an analog-to-digital (A/D) converter, one or more buffers, a digital baseband, or the like.

The sensor(s)/sensor interface(s) 1010 may include or may be capable of interfacing with any suitable type of sensing device such as, for example, inertial sensors, force sensors, thermal sensors, and so forth. Example types of inertial sensors may include accelerometers (e.g., MEMS-based accelerometers), gyroscopes, and so forth.

It should be appreciated that the program module(s), applications, computer-executable instructions, code, or the like depicted in FIG. 10 as being stored in the data storage 1014 are merely illustrative and not exhaustive and that processing described as being supported by any particular module may alternatively be distributed across multiple module(s) or performed by a different module. In addition, various program module(s), script(s), plug-in(s), Application Programming Interface(s) (API(s)), or any other suitable computer-executable code hosted locally on the remote server(s) 1000, and/or hosted on other computing device(s) accessible via one or more networks, may be provided to support functionality provided by the program module(s), applications, or computer-executable code depicted in FIG. 10 and/or additional or alternate functionality. Further, functionality may be modularized differently such that processing described as being supported collectively by the collection of program module(s) depicted in FIG. 10 may be performed by a fewer or greater number of module(s), or functionality described as being supported by any particular module may be supported, at least in part, by another module. In addition, program module(s) that support the functionality described herein may form part of one or more applications executable across any number of systems or devices in accordance with any suitable computing model such as, for example, a client-server model, a peer-to-peer model, and so forth. In addition, any of the functionality described as being supported by any of the program module(s) depicted in FIG. 10 may be implemented, at least partially, in hardware and/or firmware across any number of devices.

It should further be appreciated that the remote server(s) 1000 may include alternate and/or additional hardware, software, or firmware components beyond those described or depicted without departing from the scope of the disclosure. More particularly, it should be appreciated that software, firmware, or hardware components depicted as forming part of the remote server(s) 1000 are merely illustrative and that some components may not be present or additional components may be provided in various embodiments. While various illustrative program module(s) have been depicted and described as software module(s) stored in data storage 1014, it should be appreciated that functionality described as being supported by the program module(s) may be enabled by any combination of hardware, software, and/or firmware. It should further be appreciated that each of the above-mentioned module(s) may, in various embodiments, represent a logical partitioning of supported functionality. This logical partitioning is depicted for ease of explanation of the functionality and may not be representative of the structure of software, hardware, and/or firmware for implementing the functionality. Accordingly, it should be appreciated that functionality described as being provided by a particular module may, in various embodiments, be provided at least in part by one or more other module(s). Further, one or more depicted module(s) may not be present in certain embodiments, while in other embodiments, additional module(s) not depicted may be present and may support at least a portion of the described functionality and/or additional functionality. Moreover, while certain module(s) may be depicted and described as sub-module(s) of another module, in certain embodiments, such module(s) may be provided as independent module(s) or as sub-module(s) of other module(s).

One or more operations of the methods, process flows, and use cases of FIGS. 1-9 may be performed by a device having the illustrative configuration depicted in FIG. 10, or more specifically, by one or more engines, program module(s), applications, or the like executable on such a device. It should be appreciated, however, that such operations may be implemented in connection with numerous other device configurations.

The operations described and depicted in the illustrative methods and process flows of FIGS. 1-9 may be carried out or performed in any suitable order as desired in various example embodiments of the disclosure. Additionally, in certain example embodiments, at least a portion of the operations may be carried out in parallel. Furthermore, in certain example embodiments, less, more, or different operations than those depicted in FIGS. 1-9 may be performed.

Although specific embodiments of the disclosure have been described, one of ordinary skill in the art will recognize that numerous other modifications and alternative embodiments are within the scope of the disclosure. For example, any of the functionality and/or processing capabilities described with respect to a particular device or component may be performed by any other device or component. Further, while various illustrative implementations and architectures have been described in accordance with embodiments of the disclosure, one of ordinary skill in the art will appreciate that numerous other modifications to the illustrative implementations and architectures described herein are also within the scope of this disclosure.

Certain aspects of the disclosure are described above with reference to block and flow diagrams of systems, methods, apparatuses, and/or computer program products according to example embodiments. It will be understood that one or more blocks of the block diagrams and flow diagrams, and combinations of blocks in the block diagrams and the flow diagrams, respectively, may be implemented by execution of computer-executable program instructions. Likewise, some blocks of the block diagrams and flow diagrams may not necessarily need to be performed in the order presented, or may not necessarily need to be performed at all, according to some embodiments. Further, additional components and/or operations beyond those depicted in blocks of the block and/or flow diagrams may be present in certain embodiments.

Accordingly, blocks of the block diagrams and flow diagrams support combinations of means for performing the specified functions, combinations of elements or steps for performing the specified functions, and program instruction means for performing the specified functions. It will also be understood that each block of the block diagrams and flow diagrams, and combinations of blocks in the block diagrams and flow diagrams, may be implemented by special-purpose, hardware-based computer systems that perform the specified functions, elements or steps, or combinations of special-purpose hardware and computer instructions.

Program module(s), applications, or the like disclosed herein may include one or more software components including, for example, software objects, methods, data structures, or the like. Each such software component may include computer-executable instructions that, responsive to execution, cause at least a portion of the functionality described herein (e.g., one or more operations of the illustrative methods described herein) to be performed.

A software component may be coded in any of a variety of programming languages. An illustrative programming language may be a lower-level programming language such as an assembly language associated with a particular hardware architecture and/or operating system platform. A software component comprising assembly language instructions may require conversion into executable machine code by an assembler prior to execution by the hardware architecture and/or platform.

Another example programming language may be a higher-level programming language that may be portable across multiple architectures. A software component comprising higher-level programming language instructions may require conversion to an intermediate representation by an interpreter or a compiler prior to execution.

Other examples of programming languages include, but are not limited to, a macro language, a shell or command language, a job control language, a script language, a database query or search language, or a report writing language. In one or more example embodiments, a software component comprising instructions in one of the foregoing examples of programming languages may be executed directly by an operating system or other software component without having to be first transformed into another form.

A software component may be stored as a file or other data storage construct. Software components of a similar type or functionally related may be stored together such as, for example, in a particular directory, folder, or library. Software components may be static (e.g., pre-established or fixed) or dynamic (e.g., created or modified at the time of execution).

Software components may invoke or be invoked by other software components through any of a wide variety of mechanisms. Invoked or invoking software components may comprise other custom-developed application software, operating system functionality (e.g., device drivers, data storage (e.g., file management) routines, other common routines and services, etc.), or third-party software components (e.g., middleware, encryption, or other security software, database management software, file transfer or other network communication software, mathematical or statistical software, image processing software, and format translation software).

Software components associated with a particular solution or system may reside and be executed on a single platform or may be distributed across multiple platforms. The multiple platforms may be associated with more than one hardware vendor, underlying chip technology, or operating system. Furthermore, software components associated with a particular solution or system may be initially written in one or more programming languages, but may invoke software components written in another programming language.

Computer-executable program instructions may be loaded onto a special-purpose computer or other particular machine, a processor, or other programmable data processing apparatus to produce a particular machine, such that execution of the instructions on the computer, processor, or other programmable data processing apparatus causes one or more functions or operations specified in the flow diagrams to be performed. These computer program instructions may also be stored in a computer-readable storage medium (CRSM) that upon execution may direct a computer or other programmable data processing apparatus to function in a particular manner, such that the instructions stored in the computer-readable storage medium produce an article of manufacture including instruction means that implement one or more functions or operations specified in the flow diagrams. The computer program instructions may also be loaded onto a computer or other programmable data processing apparatus to cause a series of operational elements or steps to be performed on the computer or other programmable apparatus to produce a computer-implemented process.

Additional types of CRSM that may be present in any of the devices described herein may include, but are not limited to, programmable random access memory (PRAM), SRAM, DRAM, RAM, ROM, electrically erasable programmable read-only memory (EEPROM), flash memory or other memory technology, compact disc read-only memory (CD-ROM), digital versatile disc (DVD) or other optical storage, magnetic cassettes, magnetic tape, magnetic disk storage or other magnetic storage devices, or any other medium which can be used to store the information and which can be accessed. Combinations of any of the above are also included within the scope of CRSM. Alternatively, computer-readable communication media (CRCM) may include computer-readable instructions, program module(s), or other data transmitted within a data signal, such as a carrier wave, or other transmission. However, as used herein, CRSM does not include CRCM.

Although embodiments have been described in language specific to structural features and/or methodological acts, it is to be understood that the disclosure is not necessarily limited to the specific features or acts described. Rather, the specific features and acts are disclosed as illustrative forms of implementing the embodiments. Conditional language, such as, among others, "can," "could," "might," or "may," unless specifically stated otherwise, or otherwise understood within the context as used, is generally intended to convey that certain embodiments could include, while other embodiments do not include, certain features, elements, and/or steps. Thus, such conditional language is not generally intended to imply that features, elements, and/or steps are in any way required for one or more embodiments or that one or more embodiments necessarily include logic for deciding, with or without user input or prompting, whether these features, elements, and/or steps are included or are to be performed in any particular embodiment.

That which is claimed is:

1. A method comprising:
determining, by one or more computer processors coupled to at least one memory, a first product identifier for a first product in a product category;
determining a first set of features of the first product;
determining a second product identifier for a second product in the product category, wherein the second product is an alternative product to the first product;
determining a second set of features of the second product;
comparing the first set of features and the second set of features;
determining a set of distinguished features comprising a first feature and a second feature, wherein the set of distinguished features comprises features in the second set of features that are distinguished from the first set of features;
ranking the set of distinguished features, wherein the first feature is a highest-ranked feature based at least in part on product manufacturer information indicating that the first feature is a feature that is unavailable for the first product;
determining a price difference between the first product and the second product;
determining a product rating difference between the first product and the second product;
generating a graphical user interface for presentation on a device display, the graphical user interface comprising a product web with a first product description graphic for the first product and a second product description graphic for the second product, wherein the product web is navigatable from the first product description graphic to the second product description graphic; and
presenting, at the device display, the graphical user interface, the first feature, the price difference, and the product rating difference, wherein selection of the second product description graphic results in redirection to a second product webpage, and wherein a distance between the first product description graphic and the second product description graphic is determined based at least in part on the price difference or the product rating difference, and wherein the graphical user interface is formatted based at least in part on properties or a size of a display device.

2. The method of claim 1, further comprising:
determining product reviews for the second product;
determining a first frequency of occurrence of a first keyword associated with the second feature in the product reviews;
determining a third feature in the set of distinguished features;
determining a second frequency of occurrence of a second keyword associated with the third feature in the product reviews;
determining that the second frequency of occurrence is greater than the first frequency of occurrence; and
presenting the third feature;
wherein ranking the set of distinguished features further comprises ranking the third feature as a second-ranked feature.

3. The method of claim 1, further comprising:
determining a third feature in the set of distinguished features;
determining a first weight to assign to the first feature using the product manufacturer information;
determining a second weight to assign to the second feature using a first number of search queries for the second product that include the second feature; and
determining a third weight to assign to the third feature using a second number of search queries for the second product that include the third feature;

wherein ranking the set of distinguished features comprises ranking the set of distinguished features by weight, wherein the first weight is greater than the second weight and the third weight.

4. The method of claim 1, further comprising:
determining a user profile comprising historical search data indicative of search queries associated with the user profile;
determining a third feature in the set of distinguished features;
determining that the historical search data comprises a keyword associated with the third feature; and
presenting the third feature;
wherein ranking the set of distinguished features further comprises ranking the third feature as a second-ranked feature.

5. A method comprising:
determining, by one or more computer processors coupled to at least one memory, a first product identifier for a first product;
determining a second product identifier for a second product that is an alternative to the first product;
determining a first product difference between the first product and the second product;
determining a second product difference between the first product and the second product;
ranking the first product difference and the second product difference;
generating a first graphical indicator for the first product and a second graphical indicator for the second product, the second graphical indicator comprising the first product difference;
determining a price difference between the first product and the second product;
determining a product rating difference between the first product and the second product; and
sending the first graphical indicator, and the second graphical indicator, the price difference, and the product rating difference in a graphical user interface, wherein a distance between the first graphical indicator and the second graphical indicator is determined based at least in part on the price difference or the product rating difference, and wherein the graphical user interface is formatted based at least in part on properties or a size of a display device.

6. The method of claim 5, further comprising:
determining a first weight for the first product difference; and
determining a second weight for the second product difference;
wherein ranking the first product difference and the second product difference comprises ranking the first product difference and the second product difference based at least in part on the first weight and the second weight.

7. The method of claim 6, further comprising:
determining a first frequency of occurrence of first terms associated with the first product difference in product reviews associated with the first product and the second product; and
determining a second frequency of occurrence of second terms associated with the second product difference in the product reviews;
wherein ranking the first product difference and the second product difference comprises ranking the first product difference and the second product difference based at least in part on the first frequency of occurrence and the second frequency of occurrence.

8. The method of claim 5, further comprising:
determining a product category identifier associated with the first product identifier and the second product identifier;
determining manufacturer provided information for products associated with the product category identifier;
determining a first previously unavailable feature using the manufacturer provided information;
determining that the first previously unavailable feature is present in a threshold number of products associated with the product category identifier; and
determining that the first previously unavailable feature is the first product difference;
wherein ranking the first product difference and the second product difference comprises ranking the first product difference over the second product difference.

9. The method of claim 5, further comprising:
determining a user profile comprising historical search data; and
determining that the historical search data comprises a keyword associated with the first product difference;
wherein ranking the first product difference and the second product difference comprises ranking the first product difference over the second product difference.

10. The method of claim 5, further comprising:
determining a first weight to assign to the first product difference based at least in part on a first number of search queries for the second product that include the second product difference; and
determining a second weight to assign to the second product difference using a second number of search queries for the second product that include the second product difference;
wherein ranking the first product difference and the second product difference comprises ranking the first product difference and the second product difference by weight.

11. The method of claim 5, further comprising:
determining a first product category identifier associated with the first product identifier and the second product identifier;
determining a third product from a second product category for presentation as an alternative to the first product; and
sending a third product identifier for the third product.

12. The method of claim 5, further comprising:
determining a manufacturer identifier of a manufacturer of the first product; and
determining that the second product is associated with the manufacturer identifier.

13. The method of claim 5, further comprising:
generating a graphical connector between the first graphical indicator and the second graphical indicator, wherein the first product difference is presented at the graphical connector.

14. The method of claim 13, further comprising:
determining that the second product has more product features than the first product;
wherein the graphical connector indicates that the second product has more product features than the first product.

15. The method of claim 5, wherein sending the first graphical indicator and the second graphical indicator in the graphical user interface comprises:

determining a device display at which to present the graphical user interface; and formatting the graphical user interface based at least in part on device display properties of the device display.

16. A device comprising:

at least one memory that stores computer-executable instructions; and at least one processor configured to access the at least one memory and execute the computer-executable instructions to:

determine a first product identifier for a first product;

determine a second product identifier for a second product that is an alternative to the first product;

determine a first product difference between the first product and the second product;

determine a second product difference between the first product and the second product;

rank the first product difference and the second product difference;

generate a first graphical indicator for the first product and a second graphical indicator for the second product, the second graphical indicator comprising the first product difference;

determine a price difference between the first product and the second product;

determine a product rating difference between the first product and the second product; and send the first graphical indicator, and the second graphical indicator, the price difference, and the product rating difference in a graphical user interface, wherein a distance between the first graphical indicator and the second graphical indicator is determined based at least in part on the price difference or the product rating difference, and wherein the graphical user interface is formatted based at least in part on properties or a size of a display device.

17. The device of claim 16, wherein the at least one processor is further configured to access the at least one memory and execute the computer-executable instructions to:

determine a first weight for the first product difference; and determine a second weight for the second product difference;

wherein the at least one processor is configured to execute the computer-executable instructions to rank the first product difference and the second product difference by executing the computer-executable instructions to rank the first product difference and the second product difference based at least in part on the first weight and the second weight.

18. The device of claim 16, wherein the at least one processor is further configured to access the at least one memory and execute the computer-executable instructions to:

determine a first frequency of occurrence of first terms associated with the first product difference in product reviews associated with the first product and the second product; and determine a second frequency of occurrence of second terms associated with the second product difference in the product reviews;

wherein the at least one processor is configured to execute the computer-executable instructions to rank the first product difference and the second product difference by executing the computer-executable instructions to rank the first product difference and the second product difference based at least in part on the first frequency of occurrence and the second frequency of occurrence.

19. The device of claim 16, wherein the at least one processor is further configured to access the at least one memory and execute the computer-executable instructions to:

determine a product category identifier associated with the first product identifier and the second product identifier;

determine manufacturer provided information for products associated with the product category identifier;

determine a first previously unavailable feature using the manufacturer provided information;

determine that the first previously unavailable feature is present in a threshold number of products associated with the product category identifier; and determine that the first previously unavailable feature is the first product difference.

20. The device of claim 16, wherein the at least one processor is further configured to access the at least one memory and execute the computer-executable instructions to:

determine a user profile comprising historical search data; and determine that the historical search data comprises a keyword associated with the first product difference.

* * * * *